US010856291B2

(12) United States Patent
    Park

(10) Patent No.: US 10,856,291 B2
(45) Date of Patent: *Dec. 1, 2020

(54) METHOD AND APPARATUS FOR WIRELESS COMMUNICATION IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,281

(22) Filed: Feb. 1, 2019

(65) Prior Publication Data

US 2019/0166600 A1    May 30, 2019

Related U.S. Application Data

(63) Continuation of application No. 15/427,460, filed on Feb. 8, 2017, now Pat. No. 10,231,237, which is a
(Continued)

(30) Foreign Application Priority Data

Aug. 8, 2014   (KR) .................. 10-2014-0102644
Aug. 9, 2014   (KR) .................. 10-2014-0102678
Aug. 11, 2014  (KR) .................. 10-2014-0103988

(51) Int. Cl.
    *H04W 72/04*    (2009.01)
    *H04L 1/18*     (2006.01)
    (Continued)

(52) U.S. Cl.
    CPC ....... *H04W 72/0446* (2013.01); *H04L 1/1861* (2013.01); *H04L 1/1887* (2013.01); *H04W 8/005* (2013.01); *H04W 72/02* (2013.01)

(58) Field of Classification Search
    CPC ............. H04W 8/005; H04W 72/0446; H04W 72/042; H04W 24/10; H04W 72/0413;
    (Continued)

(56) References Cited

U.S. PATENT DOCUMENTS 9,918,290 B2      3/2018 Li et al.
10,321,439 B2 *   6/2019 Kim .................. H04B 1/713
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.2.1, Jun. 2014, pp. 1-57, 3GPP.
(Continued)

*Primary Examiner* — Michael J Moore, Jr.

(57) ABSTRACT

A method of transmitting uplink data is provided. The method includes establishing connections with a first serving cell and a second serving cell, determining, by a user equipment (UE), a time period for a device-to-device (D2D) discovery signal communication via the second serving cell, determining, by the UE and based on an uplink grant received via the first serving cell, a first subframe associated with an uplink signal to an evolved NodeB (eNB) associated with the first serving cell, and in response to determining that the first subframe overlaps in time with the time period, refraining from transmitting the uplink signal in the first subframe, and transmitting, based on a retransmission timing, the uplink signal.

20 Claims, 23 Drawing Sheets

Related U.S. Application Data continuation of application No. PCT/KR2015/008295, filed on Aug. 7, 2015.

(51) Int. Cl.
  *H04W 8/00* (2009.01)
  *H04W 72/02* (2009.01)

(58) Field of Classification Search
  CPC ..... H04W 76/14; H04W 88/08; H04W 48/16; H04W 72/04; H04L 5/0007; H04L 5/0053
  See application file for complete search history.

(56) References Cited

U.S. PATENT DOCUMENTS

| | | | |
|---|---|---|---|
| 10,412,773 B2* | 9/2019 | Kim | H04W 72/1278 |
| 2013/0324182 A1 | 12/2013 | Deng et al. | |
| 2014/0056273 A1 | 2/2014 | Jang et al. | |
| 2015/0003287 A1 | 1/2015 | Kalhan et al. | |
| 2015/0189574 A1 | 7/2015 | Ng et al. | |
| 2015/0296365 A1 | 10/2015 | Choi et al. | |
| 2016/0142898 A1 | 5/2016 | Poitau et al. | |
| 2016/0192426 A1 | 6/2016 | Noh et al. | |
| 2016/0205574 A1 | 7/2016 | Behravan et al. | |
| 2016/0219640 A1 | 7/2016 | Jung et al. | |
| 2017/0215160 A1 | 7/2017 | Lohr et al. | |
| 2018/0145820 A1 | 5/2018 | Golitschek Edler Von Elbwart et al. | |

OTHER PUBLICATIONS

International Search Report for International Patent Application No. PCT/KR2015/008295, dated Nov. 19, 2015.
Written Opinion for International Patent Application No. PCT/KR2015/008295, dated Nov. 19, 2015.
InterDigital, "Physical channel design for D2D communication", R1-140657, 3GPP TSG-RAN WG1 Meeting #76, Prague, Czech Republic, Feb. 10-14, 2014, pp. 1-6.
ETRI, "Discussion on resource allocation for D2D discovery", R1-135279, 3GPP TSG RAN WG1 Meeting #75, San Francisco, USA, Nov. 11-15, 2013, pp. 1-5.
Intel Corporation, "Link-level Analysis of LTE-based D2D Discovery Design", R1-132943, 3GPP TSG RAN WG1 Meeting #74, Barcelona, Spain, Aug. 19-23, 2013, pp. 1-8.
InterDigital, "Synchronization and timing for broadcast D2D communication", R1-134566, 3GPP TSG RAN WG1 Meeting #74bis, Guangzhou, China, Oct. 7-11, 2013, pp. 1-4.
R1-141303, "Resource pool configuration for type-1 discovery". Samsung. 3GPP TSG RAN WG1 Meeting #76bis Shenzhen, China, Mar. 31-Apr. 4, 2014.
R1-141456, "Coexistence of D2D discovery and WAN". Qualcomm Incorporated. 3GPP TSG-RAN WG1 #76bis. Mar. 31-Apr. 4, 2014, Shenzhen, China.
R1-141751, "WF on multiplexing D2D transmission and reception". LG Electronics, Potevio, ETRI 3GPP TSG RAN WG1 #76bis Shenzhen, China, Mar. 31-Apr. 4, 2014.

* cited by examiner

METHOD AND APPARATUS FOR WIRELESS COMMUNICATION IN WIRELESS COMMUNICATION SYSTEM

CROSS-REFERENCE TO RELATED APPLICATIONS

This application is a continuation of U.S. patent application Ser. No. 15/427,460, filed on Feb. 8, 2017, which is a continuation of PCT International Patent Application No. PCT/KR2015/008295, filed on Aug. 7, 2015, which claims priority from and the benefit of Korean Patent Application Nos. 10-2014-0102644, filed on Aug. 8, 2014, 10-2014-0102678, filed on Aug. 9, 2014, and 10-2014-0103988, filed on Aug. 11, 2014, each of which is hereby incorporated by reference in its entirety.

BACKGROUND

1. Field

The present disclosure relates to wireless communication, and more particularly, to a method and apparatus for transmitting uplink data during a user equipment's monitoring period for receiving a particular signal in a wireless communication system.

2. Discussion of the Background

Device to device (D2D) communication is a communication scheme that has been utilized from the advent of the analog radio set. However, D2D communication in a wireless communication system is distinguished from existing D2D communication schemes.

D2D communication in a wireless communication system indicates communication in which geographically close user equipments (UEs) use the transmission/reception technologies of the wireless communication system in- or outside of the frequency band of the wireless communication system, and directly transmit and receive data between the UEs without sending data through infrastructure such as a base station (BS). This enables a UE to utilize wireless communication outside an area where wireless communication infrastructure is established, and reduces the network load of the wireless communication system.

A UE that supports D2D communication in the wireless communication system may also perform general wireless communication (that is, communication with a serving BS using a cell (carrier) provided by the serving BS). To this end, the serving BS transmits an uplink grant indicating transmission of a Physical Uplink Shared Channel (PUSCH) to a UE in the cell. The PUSCH carries an Uplink Shared Channel (UL-SCH), and uplink data (i.e., data to be transmitted to the BS) is transmitted through the UL-SCH.

However, a UE (D2D UE) that supports D2D communication needs to monitor whether a D2D signal is received from another D2D UE for D2D communication. Therefore, when the uplink grant received from the BS indicates transmission of a PUSCH during a period for monitoring a D2D signal, a UE that has a single transceiver chain (that is, a UE incapable of performing transmission and reception in parallel) may not perform either a PUSCH transmission or a D2D signal monitoring. In addition, even when a D2D UE is capable of performing transmission and reception in parallel, self-interference may occur, in which a transmission signal of the D2D UE is received by the D2D UE, when a PUSCH is transmitted during a D2D signal monitoring period.

To overcome the above described drawback, D2D communication needs a method for effectively performing a D2D signal transmission and reception by minimizing the effect on an existing LTE signal.

The D2D communication may be performed using a communication scheme that uses a non-licensed band such as Bluetooth or a wireless LAN. However, a communication scheme that uses the non-licensed band will have difficulty providing a planned and controlled service, which is a drawback. Particularly, the performance may be dramatically reduced by interference. Conversely, device-to-device direct communication may be operated or provided in a licensed band or in an environment where inter-system interference is under control, and may therefore be capable of supporting quality of service (QoS), of raising frequency utilization efficiency through frequency reuse, and of increasing communication-enabled distance.

In D2D communication in a licensed band, that is, a cellular communication-based D2D communication, a resource for D2D communication may be allocated through a BS and a cellular uplink spectrum. Alternately, uplink subframes may be used as the allocated resources.

The D2D discovery and communication may be operated independently from the cellular communication. In some instances, a Wide Area Network (WAN) signal is transmitted to a D2D UE from a BS through a DL spectrum and, at the same time, a D2D signal may be transmitted from another UE. In this instance, a UE having a single transceiver chain may be incapable of simultaneously transmitting or receiving signals through many frequency bands, which is a drawback. Therefore, the priority of signals to be processed must be determined and the handling of remaining low-priority signals must be defined.

SUMMARY

An aspect of the present disclosure is to provide a method and apparatus for transmitting uplink data in a wireless communication system that supports device to device (D2D) communication.

Another aspect of the present disclosure is to provide a method and apparatus for minimizing the effect of D2D communication on a wireless communication system that supports D2D communication when D2D communication is performed in the wireless communication system.

Another aspect of the present disclosure is to provide a wireless communication method and apparatus in association with a D2D signal.

Another aspect of the present disclosure is to provide a method and apparatus for preventing a collision between a D2D signal and a WAN signal.

Another aspect of the present disclosure is to provide a method and apparatus for determining priority of signals when a D2D signal and a WAN signal collide.

Another aspect of the present disclosure is to provide a method and apparatus for determining a procedure for processing a signal having a lower priority when a D2D signal and a WAN signal collide.

Another aspect of the present disclosure is to provide a method and apparatus for defining a procedure for processing a Physical HARQ Indicator Channel (PHICH) when a D2D signal reception and a PHICH reception occur at the same time.

Another aspect of the present disclosure is to provide a method and apparatus for defining a UL HARQ operation when a D2D monitoring period and a PHICH reception timing overlap.

An exemplary embodiment provides a method of transmitting uplink data, the method including: establishing connections with a first serving cell and a second serving cell; determining, by a user equipment (UE), a time period for a device-to-device (D2D) discovery signal communication via the second serving cell; determining, by the UE and based on an uplink grant received via the first serving cell, a first subframe associated with an uplink signal to an evolved NodeB (eNB) associated with the first serving cell; and in response to determining that the first subframe overlaps in time with the time period, refraining from transmitting the uplink signal in the first subframe, and transmitting, based on a retransmission timing, the uplink signal.

An exemplary embodiment provides a method of transmitting uplink data, the method including: determining, by a user equipment (UE), a time period for monitoring a device-to-device (D2D) discovery signal communication; determining, by the UE, a first subframe associated with a Hybrid Automatic Repeat Request (HARQ) feedback reception; and based on whether the first subframe overlaps in time with the time period, setting a state variable associated with the HARQ feedback reception to acknowledgement.

An exemplary embodiment provides a user equipment to transmit uplink data, the UE including: a transmitter; a memory; and a processor. The processor may establish connections with a first serving cell and a second serving cell, determine a time period for a device-to-device (D2D) discovery signal communication via the second serving cell, determine, based on an uplink grant received via the first serving cell, a first subframe associated with an uplink signal to an evolved NodeB (eNB) associated with the first serving cell, and in response to determining that the first subframe overlap in time with the time period, control the transmitter to refrain from transmitting the uplink signal in the first subframe, and control the transmitter to transmit, based on a retransmission timing, the uplink signal.

According to the present disclosure, the effect of D2D communication on a wireless communication system may be minimized when the D2D communication is performed in the wireless communication system, and a user equipment (UE) may flexibly perform both an uplink transmission and D2D communication.

According to the present disclosure, general operations of a UE and a BS may be defined according to priority when a D2D signal and a WAN signal collide, and the effect of the D2D signal on WAN performance may be minimized when a UE performs D2D communication.

According to the present disclosure, from the perspective of a UE, D2D discovery and D2D communication may be supported through limited UE capabilities (e.g., a single transceiver chain based-UE), and the WAN performance may be corrected by providing a method of receiving and processing various physical channels (e.g., a PHICH) that carry a signal received over a WAN.

According to the present disclosure, by effectively controlling a PHICH reception in a D2D environment, an uplink (UL) HARQ operation may be efficiently implemented and unnecessary consumption of radio resources in a network may be reduced.

A UE may transmit or receive a D2D signal according to priority, and may generally secure efficiency of D2D discovery and D2D communication.

DETAILED DESCRIPTION OF THE ILLUSTRATED EMBODIMENTS

Figure 1:
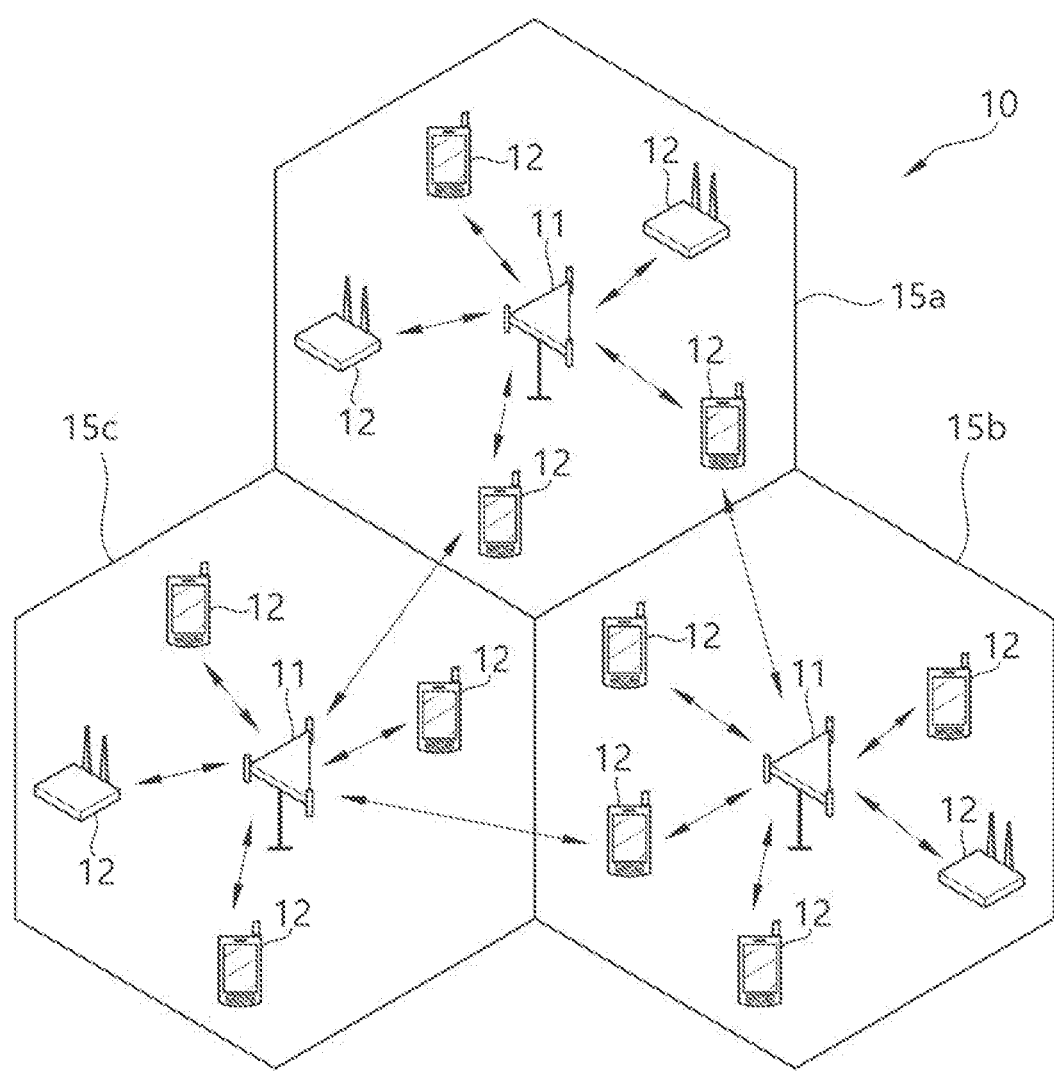
FIG. 1 is a diagram illustrating a wireless communication system according to the present disclosure.

Hereinafter, a few embodiments of the present disclosure will be described with reference to the exemplary drawings. In the following description, the same elements will be designated by the same reference numerals although they are shown in different drawings. Further, in the following description of the present disclosure, a detailed description of known functions and configurations incorporated herein will be omitted when the description may make the subject matter of the present disclosure unclear.

In addition, the present specification provides descriptions associated with a wireless communication network. Tasks executed in the wireless communication network may be performed in a process where a system (for example, a base station) that manages the corresponding wireless communication network controls a network and transmits data, or may be performed in a terminal included in the corresponding wireless network.

FIG. 1 is a diagram illustrating a wireless communication system according to the present disclosure.

Referring to FIG. 1, a wireless communication system 10 may provide a communication service between a base station (BS) and a user equipment (UE). In a wireless communication system, a UE and a BS may wirelessly transmit and receive data. Also, the wireless communication system may support Device-to-Device (D2D) communication between UEs. The wireless communication system that supports the D2D communication will be described later.

A BS 11 of the wireless communication system 10 may provide a communication service to a UE that exists within the transmission coverage area of the BS 11, through a predetermined frequency band. The coverage area serviced by a BS may be also referred to as a site. The site may include various areas 15a, 15b, and 15c, which may be referred to as sectors. The sectors included in the site may be distinguished from each other based on different identifiers. Each sector 15a, 15b, and 15c may be construed as a part of the area that the BS 11 covers.

The BS 11 indicates a station that communicates with the UE 12, and may be referred to by terms such as an evolved-NodeB (eNodeB or eNB), a base transceiver system (BTS), an access point, a femto eNodeB, a Home eNodeB (HeNodeB), a relay, a remote radio head (RRH), or the like.

The UE 12 may be a stationary or mobile entity, and may be referred to by terms such as a mobile station (MS), an advanced MS (AMS), a user terminal (UT), a subscriber station (SS), a wireless device, a personal digital assistant (PDA), a wireless modem, a handheld device, or the like.

The BS 11 may be referred to as a mega cell, a macro cell, a micro cell, a pico cell, a femto cell, or the like according to the size of coverage provided by the corresponding BS. A cell may be used as a term for indicating a frequency band that a BS provides, a site of a BS, or a BS.

Hereinafter, a downlink indicates communication or a communication path from the BS 11 to the UE 12, and an uplink indicates communication or a communication path from the UE 12 to the BS 11. In a downlink, a transmitter may be a part of the BS 11, and a receiver may be a part of the UE 12. In an uplink, a transmitter may be a part of the UE 12 and a receiver may be a part of the BS 11.

A multiple access scheme applied to a wireless communication system might not be limited. For example, the wireless communication system may utilize various multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA, or the like. Further, modulation schemes may modulate signals received from multiple users of a communication system, thereby increasing the capacity of the communication system. Also, an uplink transmission and a downlink transmission may be performed based on a time division duplex (TDD) scheme that performs transmission based on different times, or based on a frequency division duplex (FDD) scheme that performs transmission based on different frequencies.

The layers of a radio interface protocol between a UE and a BS may be classified as a first layer (L1), a second layer (L2), and a third layer (L3), based on the three low layers of an Open System interconnection (OSI) model.

A physical layer belonging to a L1 provides an information transfer service using a physical channel. A physical layer is connected to a higher Media Access Control (MAC) layer through a transport cannel. A transport channel transfers data between the MAC layer and the physical layer. The transport channel is classified based on a scheme of transmitting data through a radio interface. In addition, a physical channel transfers data between different physical layers (that is, between physical layers of a UE and a BS). A physical channel may be modulated based on an Orthogonal Frequency Division Multiplexing (OFDM) scheme, and uses space formed of time and frequencies and a plurality of antennas as radio resources.

For example, a Physical Downlink Control CHannel (PDCCH) among physical channels may inform a UE of the resource allocation for a Paging CHannel (PCH) and a DownLink Shared CHannel (DL-SCH). Further, a PDCCH may inform a UE of Hybrid Automatic Repeat Request (HARQ) information associated with a DL-SCH, and may deliver to a UE an uplink scheduling grant which reports resource allocation of an uplink transmission. A Physical Control Format Indicator CHannel (PCFICH) informs a UE of the number of OFDM symbols used for PDCCHs, and is transmitted for each subframe. A Physical Hybrid ARQ Indicator CHannel (PHICH) carries a HARQ ACK/NACK signal in response to an uplink transmission. In addition, a Physical Uplink Control CHannel (PUCCH) delivers HARQ ACK/NACK with respect to a downlink transmission and uplink control information such as scheduling request, a Channel Quality Indicator (CQI), a rank indicator (RI), or the like.

The RI is information associated with the rank (that is, the number of layers) that a UE recommends. That is, the RI indicates the number of independent streams used for spatial multiplexing. The RI is fed back only when a UE operates in an MIMO mode that uses spatial multiplexing. The RI is related to one or more CQI feedbacks. That is, a fed back CQI may be calculated by assuming a predetermined RI value. Generally, the rank of a channel varies more slowly than a CQI and thus, the number of times that an RI is fed back is smaller than that of the CQI. The transmission period of an RI may be a multiple of the transmission period of a CQI/PMI. The RI is given for an overall system band, and selective RI feedback based on a frequency may not be supported.

A Physical Uplink Shared CHannel (PUSCH) delivers an UpLink Shared CHannel (UL-SCH). The PUSCH may include Channel State Information (CSI), such as a CQI, and HARQ ACK/NACK by request or according to a configuration made by a BS.

A data link layer corresponding to the second layer of the OSI model may include a MAC layer, a Radio Link Control (RLC) layer, and a Packet Data Convergence Protocol (PDCP) layer.

The MAC layer may execute mapping between a logical channel and a transport channel, and execute multiplexing or demultiplexing of a MAC Service Data Unit (SDU) that belongs to the logical channel to transport blocks provided to a physical channel on a transport channel. The MAC layer may provide a service to an RLC layer through a logical channel. The logical channel may be divided as a control channel for transferring control plane information and a traffic channel for transferring user plane information. For example, services provided from the MAC layer to a higher layer may include a data transfer service or a radio resource allocation service.

The RLC layer may perform concatenation, segmentation, and reassembly of an RLC SDU. The RLC layer provides three types of operation modes, such as a Transparent Mode (TM), an Unacknowledged Mode (UM), and an Acknowledged Mode (AM), to secure various quality of services (QoS) required by a Radio Bearer (RB).

A PDCP layer may perform (a) user data delivery, (b) header compression and ciphering, and (c) control plane data delivery and ciphering/integrity protection.

Figure 3:
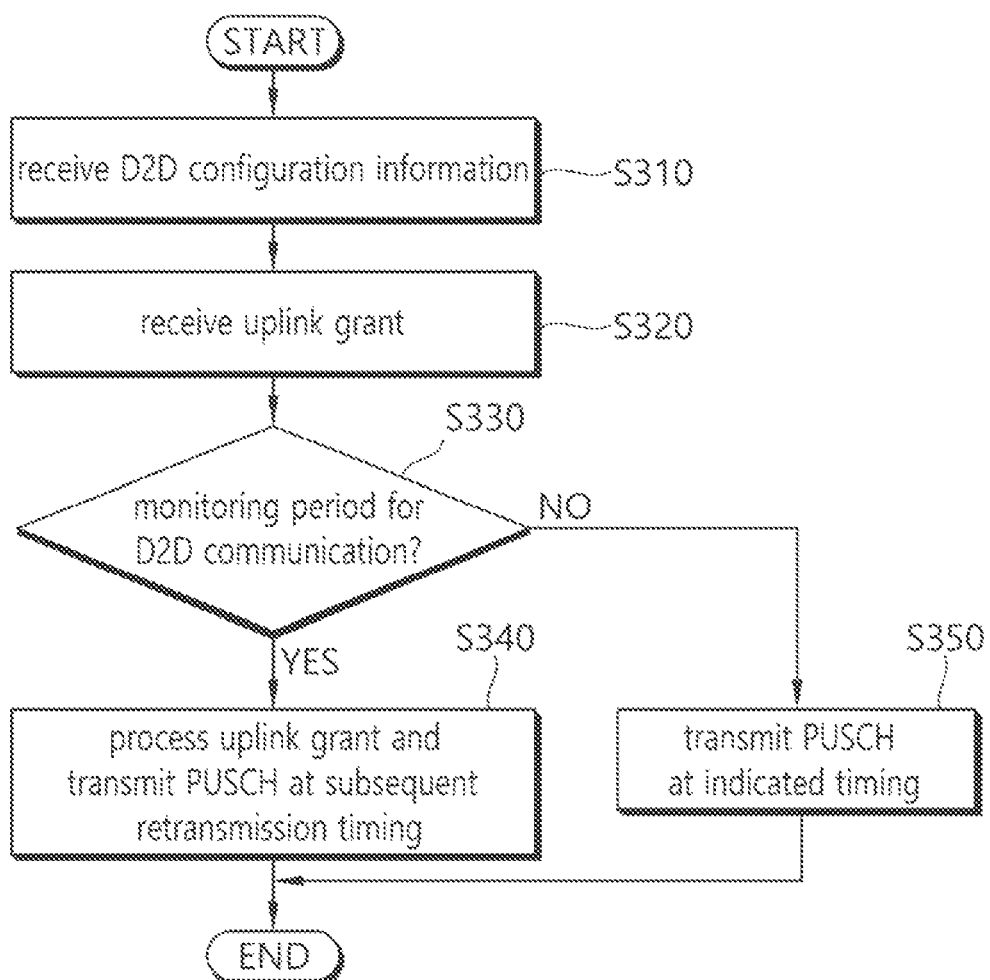
FIG. 3 is a flowchart illustrating a PUSCH transmission method according to an embodiment of the present disclosure.

Referring to FIG. 3, an RRC layer controls a logical channel, a transport channel, and a physical channel, in association with configuration, reconfiguration, and release of RBs. An RB indicates a logical path provided by a first layer (PHY layer) and a second layer (MAC layer, RLC layer, and PDCP layer) for transferring data between a UE and a network. The process of configuring an RB defines properties of a radio protocol layer and a channel for providing a predetermined service; the configuration also sets corresponding detailed parameters and an operation method. An RB may be classified as a Signaling RB (SRB) or a Data RB (DRB). An SRB is used as a path for transmitting an RRC message and a Non-Access Stratum (NAS) message in the control plane, and a DRB is used as a path for transmitting user data in the user plane. Hereinafter, the term "RB" that is expressed without distinguishing between an SRB and a DRB indicates a DRB.

Figure 2:
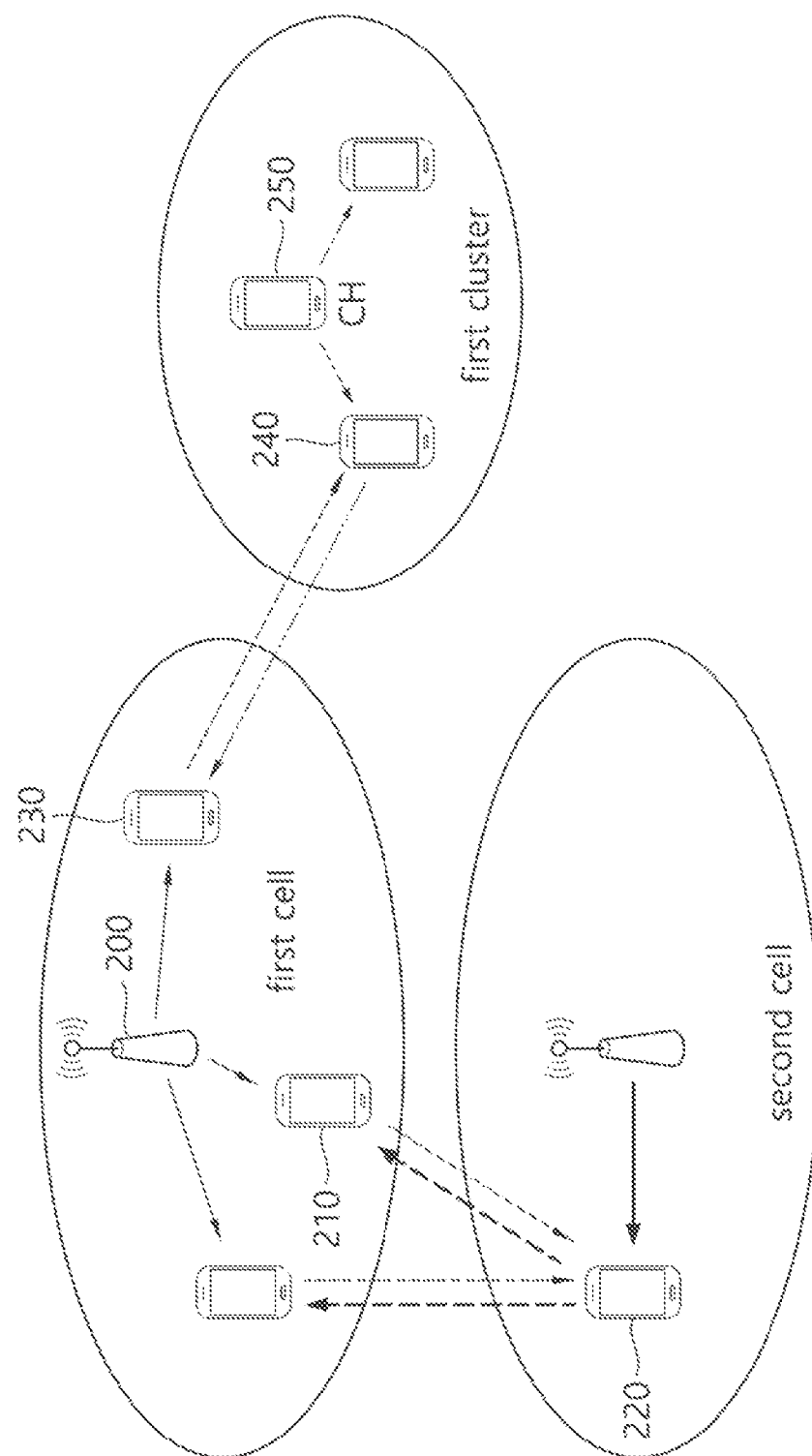
FIG. 2 is a diagram illustrating the concept of cellular network-based D2D communication according to the present disclosure.

FIG. 2 is a diagram illustrating the concept of cellular network-based D2D communication according to the present disclosure.

D2D communication refers to a technology in which UEs directly receive and transmit data. Hereinafter, a UE disclosed in embodiments of the present disclosure is assumed to support D2D communication. Also, D2D may be interchangeably used with a Proximity-based Service (ProSe) or ProSe-D2D. The use of the term "ProSe" for D2D does not indicate that the meaning of a technology which directly transmits/receives data between UEs is changed, but instead that a proximity-based service may be added.

Recently, research has been conducted on a method of performing discovery and direct communication between devices in- or outside of network coverage (in-coverage devices or out-of-coverage devices) for purpose of public safety or the like. A UE that transmits a signal based on the D2D communication is defined as a transmission UE (Tx UE), and a UE that receives a signal based on the D2D communication is defined as a reception UE (Rx UE). The Tx UE may transmit a discovery signal and the Rx UE may receive a discovery signal. The Tx UE and the Rx UE may operate by exchanging their roles. A signal transmitted by the Tx UE may be received by two or more Rx UEs.

When UEs located close to one another execute D2D communication in a cellular system, loads on a BS may be dispersed. In addition, when UEs execute D2D communication, a UE transmits data a relatively short distance, and thus, transmission power consumption and transmission latency of a UE may decrease. In addition, from the perspective of an overall system, existing cellular-based communication and D2D communication use the same resources and thus the frequency usage efficiency may potentially be improved. However, interference between cellular-based and D2D communication needs to be considered and thus each communication basically performs transmission on different subframes.

D2D communication may be classified as a communication method for a UE located within a network coverage area (base station coverage) and a communication method of a UE located outside a network coverage area (base station coverage).

Referring to FIG. 2, communication between a first UE 210 located in a first cell and a second UE 220 located in a second cell and communication between a third UE 230 located in the first cell and a fourth UE 240 located in a first cluster may be D2D communication in a network coverage area. The communication between the fourth UE 240 located in the first cluster and a fifth UE 250 located in the first cluster may be D2D communication between the UEs located outside a network coverage area. Here, the fifth UE 250 may operate as the Cluster Head (CH) of a first cluster. A CH is a UE (or unit) used as a reference for at least the purpose of synchronization, and occasionally indicates a UE that allocates a resource for different purposes. The CH may include an Independent Synchronization Source (ISS) for the synchronization of out-of-coverage UEs.

D2D communication may include a discovery process that executes discovery for communication between UEs and may include a direct communication process in which UEs transmit and receive control data and/or traffic data. D2D communication within a network coverage area may be used for purposes including public safety, an ultra-low latency service, commercial services, or the like. D2D communication outside a network coverage area may be used for only public safety.

As an embodiment in association with executing D2D communication, a BS 200 may transmit D2D resource allocation information to the first UE 210. The first UE 210 is a UE located within the coverage area of the BS 200. The D2D resource allocation information may include allocation information associated with a transmission resource and/or reception resource that may be used for D2D communication between the first UE 210 and another UE (e.g., a second UE 220).

The first UE 210 that receives the D2D resource allocation information from the BS may transmit the D2D resource allocation information to the second UE 220. The second UE 220 may be a UE located outside the coverage area of the BS 200. The first UE 210 and the second UE 220 may execute D2D communication based on the D2D resource allocation information. Particularly, the second UE 220 may obtain information associated with the D2D communication resources of the first UE 210. The second UE 220 may receive data transmitted from the first UE 210, through a resource indicated by the information associated with the D2D communication resources of the first UE 210.

In the D2D communication, a UE may transmit physical layer control data to another UE. Here, in D2D communication, physical layer control data for synchronization may be transmitted through a synchronization channel, for example, a Physical D2D Synchronization Channel (PD2DSCH). Physical layer control data for data communication may be transmitted through scheduling assignment (SA), and may be provided in a form that is similar to a PUSCH format for D2D communication or in a slightly improved variant of the PUSCH format. In D2D communication, traffic data that is practical data, distinguished from physical layer control data, may be expressed as D2D data.

Furthermore, a method of transmitting higher layer control data in addition to a physical layer in D2D communication may be defined.

When D2D communication is performed, a UE may operate in a first transmission mode or in a second transmission mode. The first transmission mode is a mode in which a UE performs D2D communication only when the UE is assigned with a resource for D2D communication from a BS. The BS transmits a D2D grant to a Tx UE for purpose of D2D resource allocation. The D2D grant indicates, for a Tx UE, parameter information that the BS needs to determine using Scheduling Assignment (SA) information, which is control information that an Rx UE needs to obtain for D2D data reception when D2D communication is performed. The parameter information may include, for example, resource allocation (Resource Pattern for Transmission (RPT))/power control/TA information and the like in association with the SA, and Resource Allocation for Transmission (RPT)/power control/TA information and the like in association with data indicated by the SA. The parameter information that the BS needs to determine may include resource allocation information associated with data indicated by the SA, and the like. The D2D grant may be transferred to a Tx UE through an (E)PDCCH channel including Downlink Control Information (DCI). The D2D grant is control information identified as information to be used for D2D through D2D-Radio Network Temporary Identifier (D2D-RNTI) allocated for each UE, differed from an uplink grant. The D2D grant may be also referred to as a SA/data grant.

The second transmission mode is a mode in which a UE performs D2D communication in an environment (out-of-coverage) that does not have indication by a BS or an environment (in-coverage) that uses only a restrictive indication. The UE may autonomously and randomly select a resource to be used from among available radio resources for D2D communication, and transmits D2D data. When information indicates that a predetermined cell in the BS is capable of supporting D2D through a system information block (SIB) dedicated signaling and when D2D resource pool information for the second mode provided from the BS exist, the UE may operate in the second transmission mode only in the predetermined cell. When the information indicating that a predetermined cell in the BS is capable of supporting D2D but the D2D resource pool information for the second transmission mode is not provided, the UE switches to an RRC-connected mode to operate in the second transmission mode, and performs the second transmission mode through dedicated RRC signaling. When the UE is located outside the network service area (that is, when the UE is an RRC idle mode UE but is also in an "Any Cell Selection" mode, which indicates that the UE does not select a service-enabled cell), the UE may operate in the second transmission mode using D2D resource pool information for the second transmission mode stored in a Universal Subscriber identity Module (USIM) Integrated Circuit Card (UICC) of the UE or the like, or D2D resource pool information for the second transmission mode that is received a BS in a previous network service area.

In the wireless communication system, a UE reports its buffer state to a BS to receive an allocation of a resource, which is required for transmitting uplink data (data to be transferred to the BS) in the buffer in the UE. Then the BS schedules resources to be allocated to each UE based on information associated with the buffer state received from a UE.

Therefore, when the wireless communication system supports D2D communication, the BS may need to schedule the resources required when any UEs existing in the coverage area (in-coverage UEs) transmit data based on mode 1 D2D communication. To this end, the BS needs to be aware of the amount of data to be transmitted in D2D communication (hereinafter D2D data), which is included in the buffer of a UE. To this end, through the following procedures, the UE reports, to the BS, the amount of data to be transmitted in D2D communication, which is included in the buffer of the UE.

A UE (D2D UE) that supports D2D communication in the wireless communication system may also perform wireless communication (e.g., LTE communication) using a BS. The wireless communication using a BS refers to communication in which a UE performs communication with a serving BS using a cell (carrier) provided by the serving BS. To this end, the serving BS transmits an uplink grant indicating a Physical Uplink Shared Channel (PUSCH) transmission to a UE in the cell. The PUSCH carries an Uplink Shared Channel (UL-SCH). Uplink data may be transmitted to a BS through the UL-SCH.

However, the D2D UE needs to monitor whether a D2D signal is received from another D2D UE for D2D communication. Therefore, when the uplink grant received from the BS indicates transmission of a PUSCH during a period for monitoring a D2D signal, a UE that has a single transceiver chain (that is, a UE incapable of performing transmission and reception in parallel) may not perform either PUSCH transmission or D2D signal monitoring. In addition, although the D2D UE is capable of performing transmission and reception in parallel, self-interference may occur, in which a D2D UE transmission signal is received by the D2D UE when a PUSCH is transmitted during a D2D signal monitoring period. Therefore, hereinafter, a method of transmitting a PUSCH without the above described drawback will be described.

Figure 4:
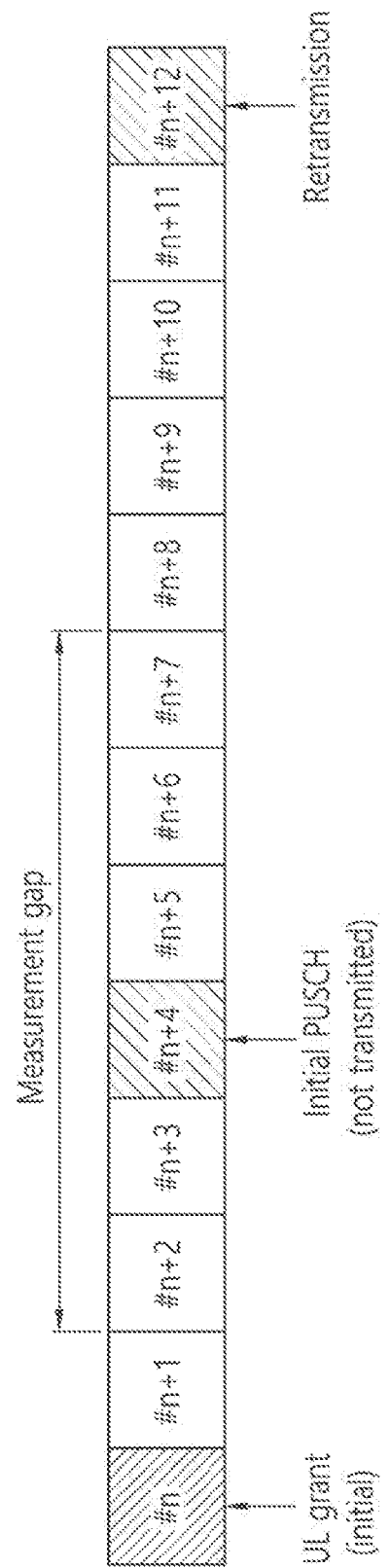
FIG. 4 is a diagram illustrating operations executed when a PUSCH transmission on a measurement gap is indicated in an LTE system.
Figure 5:
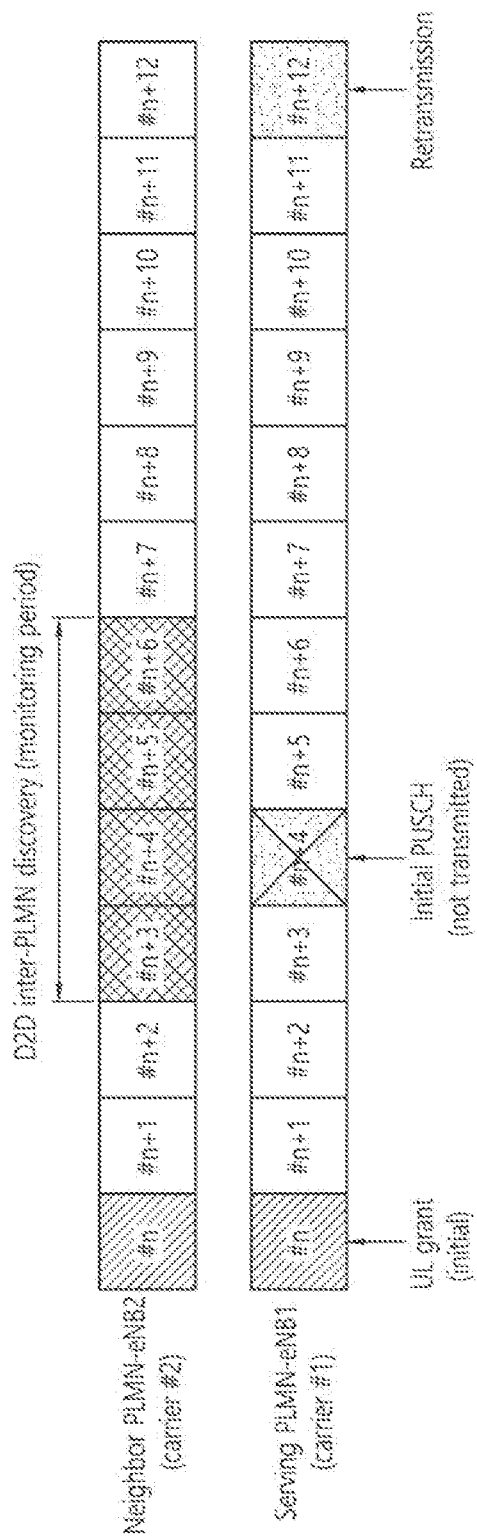
FIGS. 5 and 6 are diagrams illustrating the case of performing a non-adaptive retransmission according to an embodiment of the present disclosure.
Figure 6:
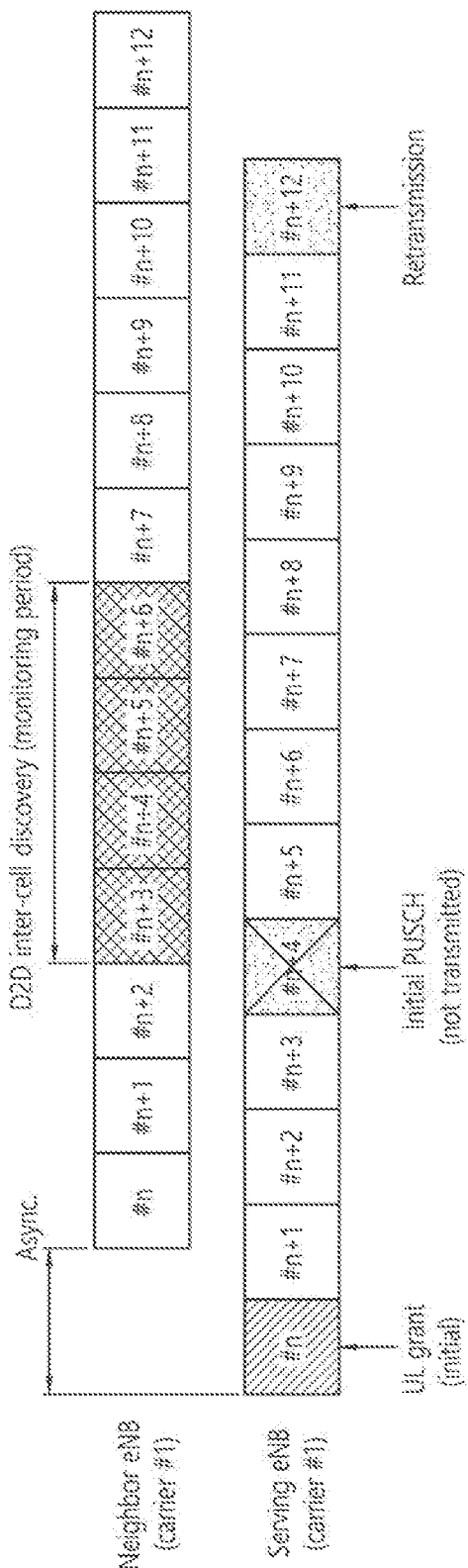

FIG. 3 is a flowchart illustrating a PUSCH transmitting method according to an embodiment of the present disclosure. FIG. 4 is a diagram illustrating operations performed when a PUSCH transmission on a measurement gap configured on a DL spectrum/subframe is indicated. FIGS. 5 and 6 are diagrams illustrating the case of performing a non-adaptive retransmission according to an embodiment of the present disclosure.

Referring to FIG. 3, a D2D UE receives D2D configuration information for D2D communication from a BS in operation S310. The D2D communication includes D2D discovery and D2D data communication as a matter of course. The D2D configuration information may be transmitted to D2D UEs through a System Information Block (SIB) and/or a dedicated RRC signal according to a D2D discovery type (type 1/2B) or a D2D data communication mode (mode 1/2). For example, when a UE is set to a first transmission mode, the UE may perform D2D communication using resources allocated from a BS. When a UE is set to a second transmission mode, the UE may perform D2D communication using resources that the UE may autonomously select from the D2D resource pool.

The information associated with the D2D resource pool may include information associated with a D2D signal monitoring period (monitoring resource information). The monitoring period is a time period set by a serving BS to enable a UE to receive a D2D signal existing on other resources (e.g., carrier) that the UE currently does not monitor, or the monitoring period may be a time period that the UE autonomously recognizes based on information obtained through an initial access operation on other resources (e.g., carrier/PLMN). The monitoring resource information may exist in a form identical to the information associated with the D2D resource pool or a subset thereof. For example, the monitoring resource information may include information associated with a period (e.g., a subframe) for monitoring D2D signals (e.g., a discovery signal) of any D2D UEs that access a Public Land Mobile Network (PLMN) that provides a serving cell to UEs. Here, the PLMN indicates a mobile communication network operator network or an identification number of a corresponding network. A network may identify a network operator that operates a corresponding frequency for a UE based on an identifier of the corresponding network, and may obtain information associated with an access privilege (e.g., access class barring).

Alternatively, the monitoring resource information may include information associated with a period for monitoring D2D signals of D2D UEs, which access a PLMN (serving PLMN) that provides a serving cell to a UE, and information associated with a period for monitoring D2D signals of D2D UEs, which access a neighboring or different PLMN. To effectively monitor both D2D signals of D2D UEs that access different cells (inter-cell) and D2D signals of D2D UEs that access different PLMNs (inter-PLMN), a predetermined monitoring period may need to be configured for a D2D UE. As described above, when a monitoring period is configured/obtained with respect to a neighboring or different PLMN, a D2D signal from a different PLMN (carrier) or a neighboring cell needs to be monitored only in the corresponding monitoring period. Therefore, D2D signal reception efficiency may increase and the amount of battery consumption may decrease.

The UE receives an uplink grant indicating transmission of a PUSCH or a PUSCH and SRS from the BS in operation S320. The uplink grant may be received before a transmission mode for D2D data communication (first transmission mode or second transmission mode) or a transmission type for D2D discovery (type 1 and type 2B) is set for the UE, or the uplink grant may be received after the D2D transmission mode/discovery type is set. When the uplink grant is received after a D2D transmission mode is set for the UE through the D2D configuration information, the UE determines whether transmission timing for a PUSCH or a PUSCH and SRS, indicated by the uplink grant, is included in a monitoring period for D2D communication in operation S330.

When the uplink grant indicates transmission of a PUSCH or a PUSCH and SRS within the monitoring period for D2D communication, the UE may process the uplink grant but may not perform (may keep) transmission of the PUSCH or the PUSCH and SRS to the BS in order to receive a D2D signal. Subsequently, the UE performs transmission at a subsequent PUSCH or PUSCH and SRS retransmission timing according to a non-adaptive retransmission procedure in operation S340. Here, the non-adaptive retransmission procedure refers to the retransmission of a PUSCH or a PUSCH and SRS at a subsequent PUSCH transmission opportunity without a HARQ ACK/NACK from a BS, as a response (feedback) to an uplink transmission associated with an indicated timing for the transmission of a PUSCH or a PUSCH and SRS. To this end, when the uplink grant indicates transmission of a PUSCH or a PUSCH and SRS within a monitoring period for D2D communication, the UE may store the uplink grant received from a HARQ entity but may not indicate corresponding transmission for a physical layer. However, when the uplink grant indicates transmission of a PUSCH beyond the monitoring period, the UE transmits a PUSCH (or a PUSCH and SRS) at an indicated timing in operation S350.

That is, as the case in which a UE having a single transceiver chain receives an indication of transmission of a PUSCH or PUSCH and SRS on a measurement gap as illustrated in FIG. 4, when a D2D UE receives an indication of transmission of a PUSCH or a PUSCH and SRS within a monitoring period for D2D communication, the D2D UE may transmit a PUSCH and a PUSCH and SRS at a subsequent PUSCH or PUSCH and SRS retransmission timing without HARQ feedback. Here, the measurement gap indicates a period for determining and measuring cells corresponding to remaining frequencies (inter-frequency and/or inter-Radio Access Technology (RAT)), excluding the carrier frequency of a serving cell. The measurement gap may be classified as a first gap pattern that is repeated based on a period of 40 ms and has a length of 6 ms, and as a second gap pattern that is repeated based on a period of 80 ms and has a length of 6 ms. A network may configure one of the two patterns for a UE.

TABLE 1

| Gap Pattern Id | MeasurementGap Length (MGL, ms) | Measurement Gap Repetition Period(MGRP, ms) | Minimum available time for inter-frequency and inter-RAT measurements during 480 ms period(Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

A trade-off exists between the first pattern and the second pattern. The first pattern has a short period but the transmission/reception of a serving cell is disturbed by interference. Conversely, the second pattern has a longer period, but less disturbs the transmission/reception of the serving cell. A UE may be incapable of transmitting any data to a BS during a measurement gap.

FIG. 4 illustrates the case in which a measurement gap is configured from an $n+2^{th}$ subframe to an $n+7^{th}$ subframe for a UE, and in which the UE receives an uplink grant indicating an initial PUSCH transmission in an $n+4^{th}$ subframe from a BS in an $n^{th}$ subframe. In this instance, the UE does not transmit a PUSCH in the $n+4^{th}$ subframe, and instead transmits the PUSCH at a subsequent retransmission timing (that is, an $n+12^{th}$ subframe). In this instance, the UE may not receive HARQ feedback at an $n+8^{th}$ subframe from the BS.

Referring to FIG. 5, in the case in which subframes from an $n+3^{rd}$ subframe to an $n+6^{th}$ subframe are configured for a UE that is provided with a first carrier from a first base station (eNB1) belonging to a serving PLMN, as a monitoring period with respect to a D2D signal (e.g., a discovery signal for D2D discovery) of a D2D UE that accesses a neighboring PLMN, when the UE receives an uplink grant indicating an initial PUSCH transmission in $n+4^{th}$ subframe from the first BS in the $n^{th}$ subframe of the first carrier, the UE may process the uplink grant but may not transmit a PUSCH in the $n+4^{th}$ subframe of the first carrier in order to receive a D2D signal. Subsequently, the UE may transmit the PUSCH, which has not been transmitted, at a subsequent retransmission timing (that is, the $n+12^{th}$ subframe) without HARQ feedback, through the non-adaptive retransmission. That is, when there is a possibility that a D2D signal reception based on a monitoring period and a PUSCH transmission based on an uplink grant occur at the same time, performing the D2D signal reception and the PUSCH transmission at the same time is not allowed in order to avoid self-interference. Therefore, the UE might not perform any uplink transmission on a resource that is configured for monitoring resource information for reception of a D2D signal, and the UE may transmit a PUSCH at a subsequent retransmission timing without a HARQ-ACK/NACK reception from the BS (non-adaptive retransmission). The non-adaptive retransmission may include a transmission performed at the same power and the MCS level, which have been used for a previous Physical Uplink Shared Channel (PUSCH) transmission.

FIG. 5 illustrates transmission of a PUSCH at a retransmission timing when an indication that indicates a PUSCH transmission in a monitoring period for monitoring D2Ds signals of D2D UEs that access different PLMNs (inter-PLMN) is received. However, it is equally applied to the case in which an indication that indicates a PUSCH transmission in a monitoring period for D2D signals of D2D UEs that access different cells (inter-cell) provided by a single network operator is received.

FIG. 6 illustrates the case in which different cells (carriers) provided by a single network operator are asynchronous. A period for monitoring D2D signals of D2D UEs that access a neighboring cell (from an $n+3^{rd}$ subframe to an $n+6^{th}$ subframe) and a timing for PUSCH transmission indicated by the uplink grant (an $n+4^{th}$ subframe) are not identical; they partially overlap. However, though the UE processes the uplink grant, it may not transmit a PUSCH at the indicated $n+4^{th}$ subframe in the same manner as the above description. Subsequently, the UE may transmit the PUSCH, which has not been transmitted, at a subsequent retransmission timing (that is, an $n+12^{th}$ subframe) without HARQ feedback through the non-adaptive retransmission. When the $n+12^{th}$ subframe and a period for monitoring D2D signals of D2D UEs that access another neighboring cell overlap again, the UE may transmit the PUSCH at an $n+20^{th}$ subframe (not illustrated).

Figure 7:
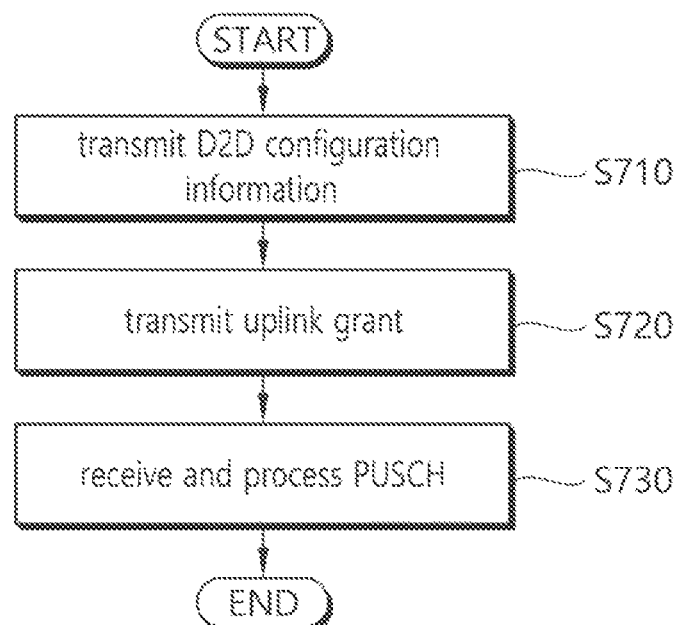
FIG. 7 is a flowchart illustrating the operations of a base station (BS) according to an embodiment of the present disclosure.

FIG. 7 is a flowchart illustrating the operations of a BS according to an embodiment of the present disclosure.

Referring to FIG. 7, a BS transmits D2D configuration information to a UE in a cell in operation S710. The D2D configuration information may be transmitted to the UE for D2D discovery or for D2D data transmission through, for example, a System Information Block (SIB) or a dedicated RRC signal. The information associated with the D2D resource pool may include information associated with a D2D signal monitoring period (monitoring resource information).

For example, the monitoring resource information may include information associated with a period for monitoring D2D signals of D2D UEs that access a single operator's network. Alternatively, the monitoring resource information may include both information associated with a period for monitoring D2D signals of D2D UEs that access the single operator's network and information associated with a period for monitoring D2D signals of D2D UEs that access a different operator's network.

The BS transmits an uplink grant indicating transmission of a PUSCH to the UE in operation S720. The UE that receives the uplink grant transmits a PUSCH using timing indicated by the uplink grant or at a retransmission timing based on monitoring information (information associated with a resource monitored by the UE for D2D communication) by checking whether a D2D signal reception and an uplink PUSCH transmission collide, and the BS processes the PUSCH received from the UE in operation S730. In this instance, the BS may not transmit a HARQ ACK/NACK even though the PUSCH is not received at the timing for a PUSCH transmission that the BS indicates through the uplink grant.

Figure 8:
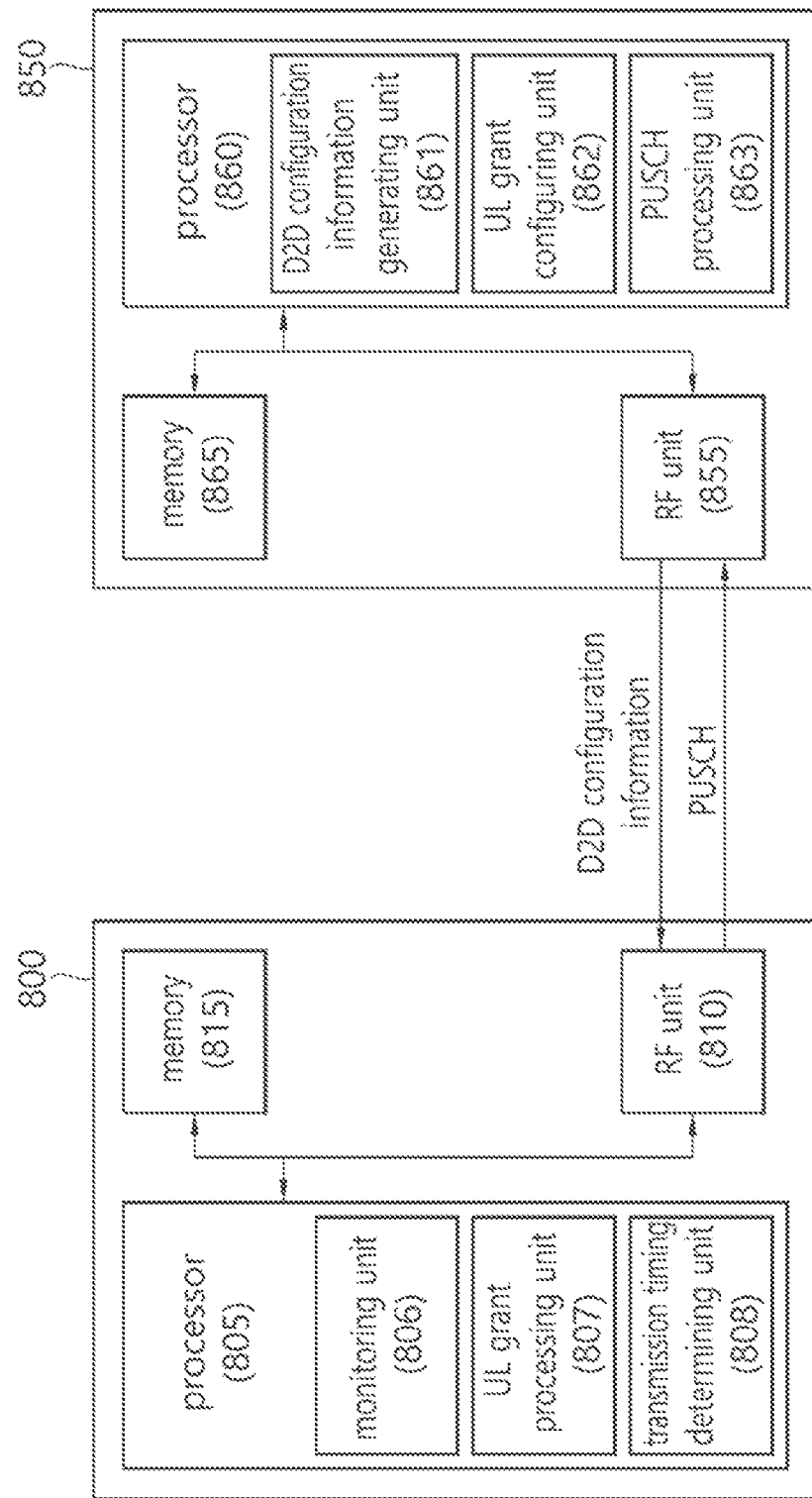
FIG. 8 is a block diagram illustrating a wireless communication system according to an embodiment of the present disclosure.

FIG. 8 is a block diagram illustrating a wireless communication system according to an embodiment of the present disclosure.

Referring to FIG. 8, a wireless communication system that supports D2D communication may include a UE 800 and a BS (or cluster head) 850.

The UE 800 includes a processor 805, a Radio Frequency (RF) unit 810, and a memory 815. The memory 815 is connected with the processor 805, and stores various pieces of information for driving the processor 805. The RF unit 810 is connected with the processor 805, and transmits and/or receives a radio signal. For example, the RF unit 810 may receive, from the BS 850, D2D configuration information which is disclosed in the present specifications, and an uplink indicating a PUSCH transmission. Also, the RF unit 810 may transmit a PUSCH to the BS 850 using timing indicated by the uplink grant or a retransmission timing.

The memory 815 may store D2D configuration information, resource pool information for the second transmission mode, and information associated with a monitoring period for reception of a D2D signal, and may then provide the information to the processor 805 upon request of the processor 805.

The processor 805 may implement functions, processes, and/or methods proposed in the present specification. Particularly, the processor 805 may implement all of the operations of FIG. 3. For example, the processor 805 may include a monitoring unit 806, a PUSCH configuring unit 807, and a transmission timing determining unit 808.

The monitoring unit 806 may monitor a D2D signal during a monitoring period configured based on information associated with the monitoring period for reception of a D2D signal. The monitoring unit 806 determines whether an uplink grant indicating a PUSCH transmission in the monitoring period is received. Here, the information associated with the monitoring period may be transmitted to the UE 800 through an SIB and/or a dedicated RRC signal.

When it is determined that the uplink grant indicating a PUSCH transmission in the monitoring period is received, the PUSCH configuring unit 807 processes the uplink grant and configures a PUSCH.

The transmission timing determining unit 808 determines a timing in which to transmit the PUSCH configured by the PUSCH configuring unit 807 according to whether the uplink grant indicating a PUSCH transmission in the monitoring period is received. For example, when the uplink grant indicating a PUSCH transmission in the monitoring period is received, the transmission timing determining unit 808 determines to transmit the configured PUSCH at a retransmission timing. The retransmission timing of the PUSCH is a value that varies based on the TDD/FDD mode of a serving cell that transmits the PUSCH. For example, in the FDD mode, retransmission may be performed after subframes corresponding to 8 ms. In the TDD mode, retransmission may be performed after a subframe value distinguished based on a set UL/DL configuration. Conversely, when the uplink grant indicates a PUSCH transmission beyond the monitoring period, the transmission timing determining unit 808 may determine to transmit the configured PUSCH at the indicated timing. Therefore, according to the present disclosure, a D2D signal reception is only performed during the monitoring period and thus self-interference caused by a PUSCH transmission may not occur.

The BS 850 includes a Radio Frequency (RF) unit 855, a processor 860, and a memory 865. The memory 865 is connected with the processor 860, and stores various pieces of information for driving the processor 860. The RF unit 855 is connected with the processor 860, and transmits and/or receives a radio signal. The processor 860 may implement the functions, processes, and/or methods proposed in the present specifications. In the above described embodiments, the operations of the BS 850 may be implemented by the processor 860. The processor 860 generates D2D configuration information disclosed in the present specification, configures an uplink grant that indicates a PUSCH transmission, and processes any PUSCH received from a UE.

To this end, the processor 860 includes a D2D configuration information generating unit 861, a UL grant configuring unit 862, and a PUSCH processing unit 863. The D2D configuration information generated by the D2D configuration information generating unit 861 may include information associated with a D2D resource pool for the second transmission mode. The information associated with the D2D resource pool may include information associated with a D2D signal monitoring period (monitoring resource information).

The monitoring resource information may include only information associated with a period for monitoring D2D signals of D2D UEs that access a single operator's network, or may also include both information associated with a period for monitoring D2D signals of D2D UEs that access the network of the single operator and information associated with a period for monitoring D2D signals of D2D UEs that access a different operator's network.

The UL grant configuring unit 862 configures an uplink grant indicating transmission of a PUSCH. The RF unit 855 transmits an uplink grant configured by the UL grant configuring unit 862 to the UE 800. The UE 800 that receives the uplink grant transmits the PUSCH using timing indicated by the uplink grant or using retransmission timing, based on the monitoring resource information. The PUSCH processing unit 863 processes the PUSCH received through the RF unit 855.

Referring again to FIG. 4, FIG. 4 illustrates the case in which a measurement gap is configured from an $n+2^{th}$ subframe to an $n+7^{th}$ subframe for a UE, and the UE receives an uplink grant indicating an initial PUSCH transmission in an $n+4^{th}$ subframe from a BS in an $n^{th}$ subframe. In this instance, the UE does not transmit a PUSCH in the $n+4^{th}$ subframe, and transmits the PUSCH in subsequent retransmission timing (that is, an $n+12^{th}$ subframe).

In this instance, the UE calculates a code rate to be different, based on different $N_{SRS}$ values, when calculating a code rate for transmission of a UCI on the PUSCH. Also, rate matching associated with the corresponding PUSCH may be performed differently based on an $N_{SRS}$ value. Rate matching refers to matching the amount of data to be transmitted for each transmission unit time (e.g., TTI) to the actual maximum amount of a channel.

Q' needs to be determined first in order to perform a channel coding of a CQI, RI information, and HARQ-ACK information. Q' indicates the number of coded modulation symbols for each layer. A coding unit may determine Q' based on a Modulation Coding Scheme (MCS) level applied to a PUSCH, and may control a code rate associated with a CQI, RI, and HARQ-ACK based on the Q'.

When only one transmission block (e.g., HARQ-ACK or RI information) is transmitted on a PUSCH (that is, single layer transmission), Q' may be calculated using Equation 1 provided below.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$ [Equation 1]

Here, O (alphabet O) denotes the number of RI bits or the number of HARQ-ACK bits. $M^{PUSCH}_{SC}$ is a bandwidth scheduled for a PUSCH transmission in a current subframe for a transmission block, and is expressed by the number of subcarriers. $N^{PUSCH\text{-}initial}_{Symb}$ denotes the number of SC-FDMA symbols in each subframe for an initial PUSCH transmission associated with the same transmission block. $N^{PUSCH\text{-}initial}_{Symb}$ may be calculated by Equation 2 provided below.

$$N_{symb}^{PUSCH\text{-}initial} = (2 \cdot (N_{symb}^{UL} - 1) - N_{SRS})$$ [Equation 2]

Here, $N_{SRS}$ has a value of 1 or 0. For example, $N_{SRS}$ may be 1 (a) when a UE configured with a single UL serving cell is set to transmit a PUSCH and an SRS in the same subframe for an initial PUSCH transmission; or (b) when a UE transmits a PUSCH and an SRS in the same subframe for an initial transmission and the UE is configured with multiple Timing Advance Groups (TAGs); or (c) when a PUSCH resource allocation for an initial transmission even partially overlaps a cell-specific SRS subframe and bandwidth configuration; or (d) when a subframe for an initial transmission is a UE-specific type-1 SRS subframe in the same serving cell; or (e) when a subframe for an initial transmission is a UE-specific type-0 SRS subframe in the same serving cell, and the UE is configured with multiple Timing Advance Groups (TAGs). Otherwise, $N_{SRS}$ will be 0.

Referring again to Equation 1 $M^{PUSCH\text{-}initial}{}_{SC}$, C, and Kr may be obtained from an initial PDCCH (or EPDCCH [enhanced-PDCCH]) for the same transmission block. When an initial PDCCH (or EPDCCH) of downlink control information (DCI) format 0/4 for the same transmission block does not exist, $M^{PUSCH\text{-}initial}{}_{SC}$, C, and Kr may be determined as follows. In one example, $M^{PUSCH\text{-}initial}{}_{SC}$, C, and Kr may be determined from the latest semi-persistent scheduling-allocated PDCCH (or EPDCCH) when the same transmission block is semi-persistently scheduled. In another example, $M^{PUSCH\text{-}initial}{}_{SC}$, C and Kr may be determined based on a random access response for the same transmission block when the PUSCH is initiated by a random access response grant.

From the perspective of PUSCH rate matching, a PUSCH may be allocated using resource elements (REs), excluding: (a) REs for a reference signal transmission; (b) an SC-FDMA symbol configured for an SRS transmission when a UE is configured with a single cell; (c) a last SC-FDMA symbol in one subframe when a UE is not configured with M-TAG and transmits an SRS in the same subframe; (d) a last SC-FDMA symbol of a subframe to which a cell-specific SRS is configured when a PUSCH transmission and a cell-specific SRS bandwidth partially or completely overlap; (e) an SC-FDMA symbol reserved for an available SRS transmission in a UE-specific aperiodic SRS subframe on the same serving cell; and (f) an SC-FDMA symbol reserved for an available SRS transmission in a UE-specific periodic SRS subframe and a UE configured with M-TAG.

Referring again to FIG. 4, when a PUSCH transmission indicated by a previously received uplink grant and an SRS transmission indicated by an RRC signal in a cell are configured on the same subframe in a measurement gap in DL spectrums/subframes for which a single serving cell is configured, a non-adaptive retransmission operation is applied and thus a PUSCH may be retransmitted using subsequent retransmission timing (that is, n+12$^{th}$ timing) without HARQ-ACK feedback. In this instance, when an initial PUSCH and an SRS are configured to transmit in the same subframe, a UE configured with a single uplink cell may assume $N_{SRS}=1$ for a subsequently retransmitted PUSCH. When a UCI transmission occurs at the same time in a subframe where the subsequent retransmission is performed, a UCI code rate is calculated to perform mapping (e.g., piggyback) of the corresponding UCI (HARQ-ACK, RI, CQI) to the PUSCH.

Conversely, to receive an inter-PLMN discovery or an inter-carrier discovery, a UE configured with D2D discovery may need to monitor a carrier frequency that is different from a carrier frequency that a serving PLMN uses. The present disclosure defines the period as a "monitoring period". When a D2D signal reception based on a monitoring period and a PUSCH transmission based on a previous uplink grant are performed at the same time, serious self-interference may occur. In this instance, an uplink transmission may not be allowed to more reliably implement operations of a UE. Therefore, in this instance, the present disclosure assumes that a D2D signal reception is performed in preference to an uplink transmission.

Figure 9:
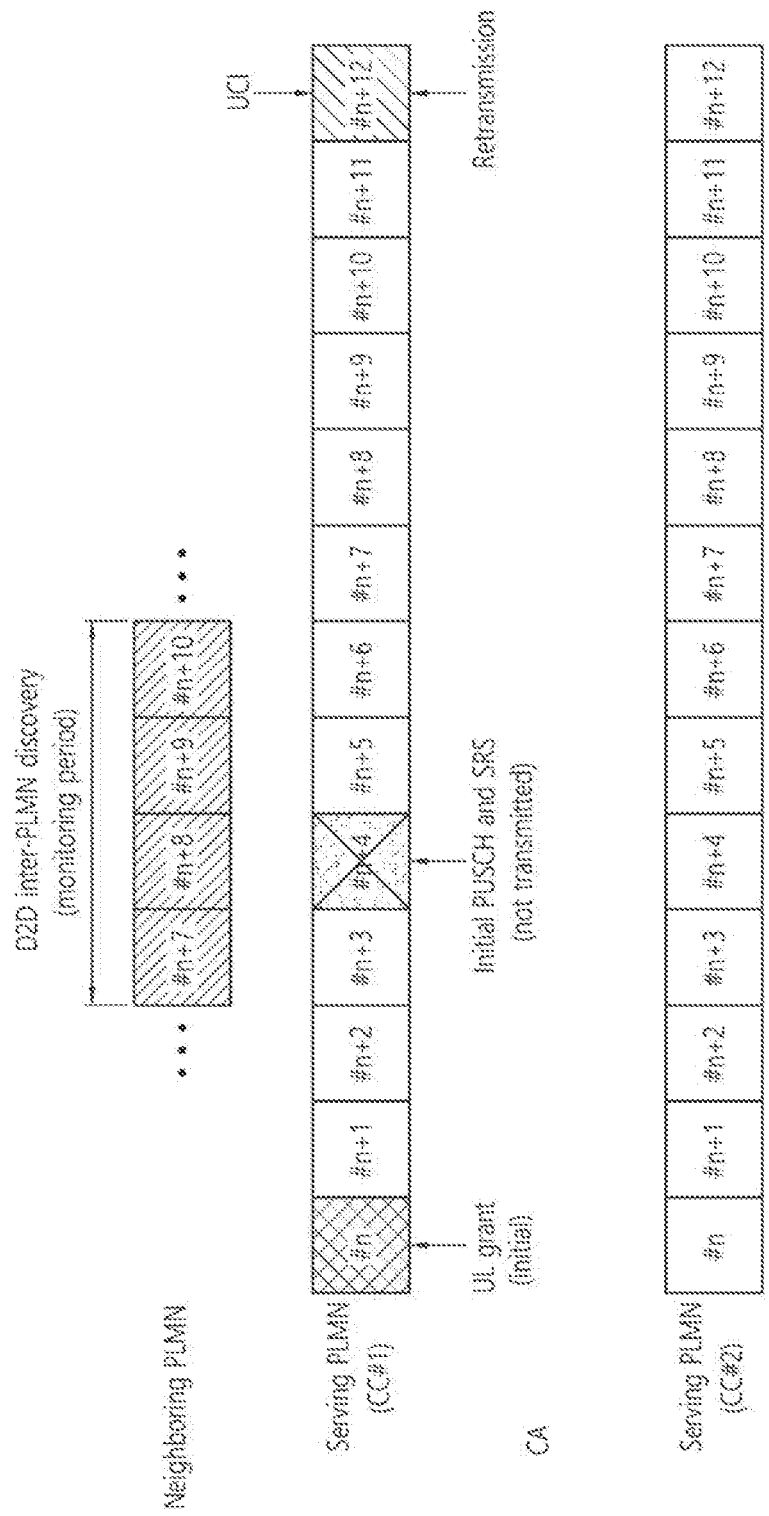
FIGS. 9 and 10 are diagrams illustrating the case in which an initial PUSCH transmission and an SRS transmission are performed in a monitoring period according to an embodiment of the present disclosure.
Figure 10:
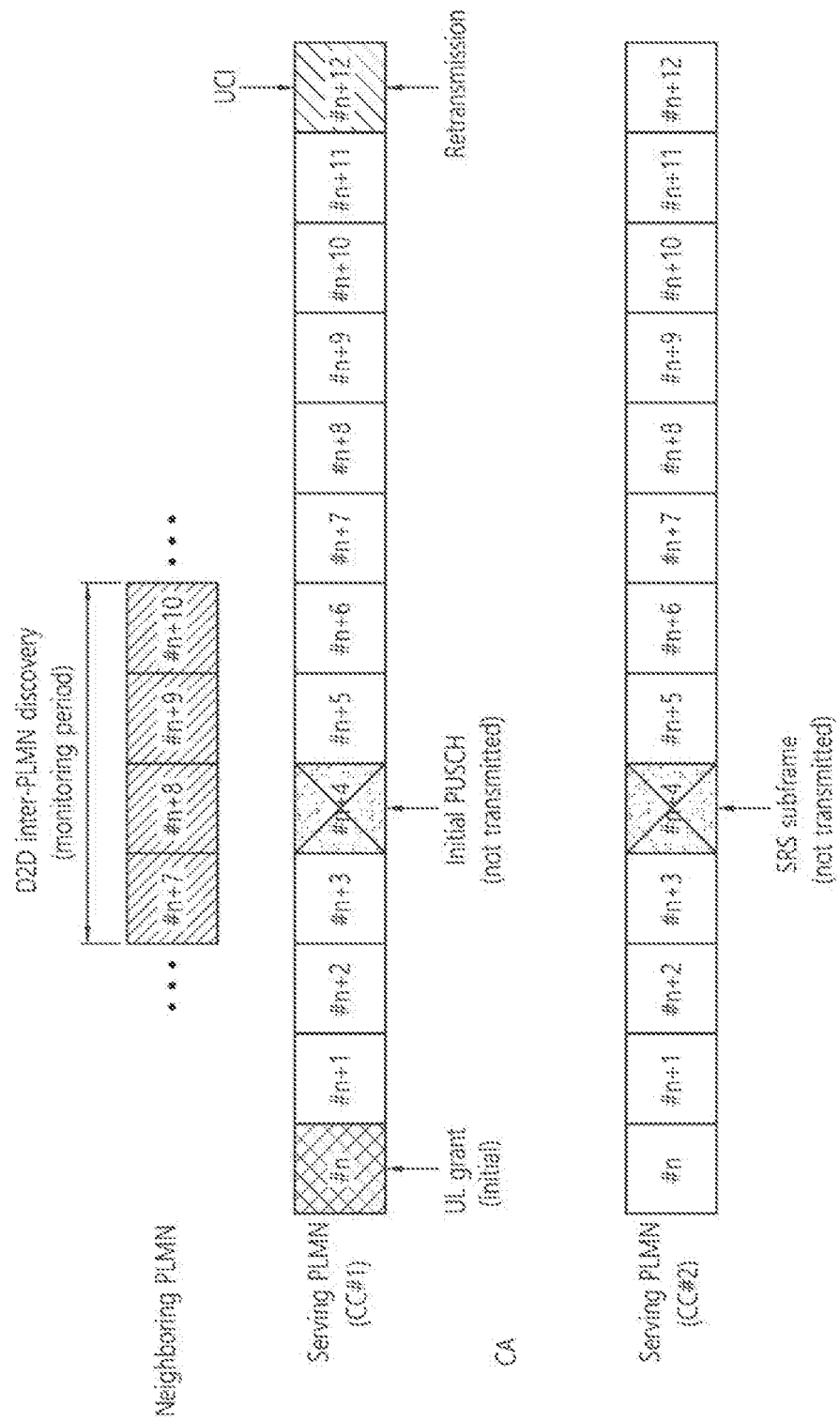

FIGS. 9 and 10 are diagrams illustrating the case in which an initial PUSCH transmission and an SRS transmission are performed in a monitoring period according to an embodiment of the present disclosure.

Referring to FIGS. 9 and 10, in the case in which subframes from an n+3$^{th}$ subframe to an n+6$^{th}$ subframe are configured for a UE that is provided with a first carrier from a first base station (eNB1) belonging to a serving PLMN, as a monitoring period with respect to a D2D signal (e.g., a discovery signal for D2D discovery) of a D2D UE that accesses a neighboring PLMN: when the UE receives an uplink grant indicating an initial PUSCH transmission in n+4$^{th}$ subframe from the first BS in the n$^{th}$ subframe of the first carrier, the UE may process the uplink grant but may not transmit a PUSCH in the n+4$^{th}$ subframe of the first carrier in order to receive a D2D signal. Subsequently, the UE may transmit the PUSCH, which has not been transmitted, using subsequent retransmission timing (that is, an n+12$^{th}$ subframe) without HARQ feedback, through the non-adaptive retransmission. However, a serving BS may not be aware of information associated with the monitoring period of the UE. Inter-PLMN cooperation is difficult. Also, only a corresponding inter-PLMN discovery UE is capable of obtaining corresponding resource information on a different PLMN carrier through an initial cell search. To overcome the limit, a serving PLMN may obtain information associated with a D2D discovery resource of a different PLMN by performing inter-PLMN cooperation in advance or by executing a method in which an inter-PLMN discovery UE obtains corresponding resource information on a different PLMN carrier through an initial cell search and reports the same to the serving PLMN. Therefore, in this situation, a serving BS (serving PLMN) provides an uplink grant to a UE and a PUSCH may be transmitted using subsequent retransmission timing (that is, an n+12$^{th}$ subframe) in response to the uplink grant (when retransmission is required), irrespective of whether the serving PLMN obtains discovery information of a different PLMN or not. In this instance, assumptions associated with a code rate of a UCI and a PUSCH rate matching may be different between a BS and a UE. For example, a UE is configured with M-TAG for one or more uplink cells (UL CA) for a PUSCH transmission, and an initial PUSCH and a type 0 SRS (periodic SRS) are on the same subframe of the same serving cell, and an SRS is configured to be transmitted in an n+4$^{th}$ subframe although the SRS has not been actually transmitted. Using an assumption of a UCI code rate of the serving BS under the situation, when an indication that indicates an initial PUSCH transmission in a monitoring period including a subframe (n+4$^{th}$ subframe) configured with a type 0 SRS subframe is received, the serving PLMN assumes $N_{SRS}=1$ for a retransmitted PUSCH in a retransmission subframe, calculates a UCI code rate and rate matching, and performs decoding. Conversely, a UCI code rate and rate matching on a retransmission of an inter-PLMN discovery UE are calculated and transmitted by assuming $N_{SRS}=0$ for a PUSCH retransmission because a PUSCH and an SRS are not transmitted in the n+4$^{th}$ subframe for discovery monitoring.

Therefore, if the BS receives a UCI on a PUSCH retransmission of the UE that assumes a different UCI code rate in an n+12$^{th}$ subframe, it may not successfully perform UCI decoding because the UE transmits a UCI that does not match the number of UCI symbols that the BS is aware of. It is difficult to embody a BS that can perform blind decoding with respect to $N_{SRS}=0$ or 1 to cope with the above described situation, because there is no information associated with an actual monitoring period and the BS needs to perform blind decoding with respect to all uplink subframes, which is a drawback. This may cause the BS to perform unnecessary calculation and thus complexity may dramatically increase.

To overcome this drawback, in the present disclosure, when a UE configured with one or more uplink cells is set to transmit (but does not actually transmit) an initial PUSCH and an SRS in the same subframe of the same serving cell in the monitoring period, rate matching associated with the calculation of a UCI code rate is set to always perform based on $N_{SRS}=0$ or $N_{SRS}=1$ using the retransmission timing of the corresponding PUSCH. The SRS corresponds to a UE-specific type-1 SRS subframe or a UE-specific type-0 SRS subframe, and the corresponding UE is configured with M-TAG. Although the above description has been provided for the purpose of calculating a UCI code rate, the same operations can also be described from the perspective of PUSCH rate matching. For example, when a UE configured with one or more uplink cells is set to transmit (but does not actually transmit) an initial PUSCH and an SRS on the same subframe of the same serving cell in the monitoring period, rate matching associated with a corresponding retransmitted PUSCH may allocate a PUSCH ($N_{SRS}=0$) or may not allocate a PUSCH ($N_{SRS}=1$) to a last SC-FDMA symbol, using the retransmission timing of the corresponding PUSCH.

Although it is assumed that a serving cell (or a serving PLMN) is not aware of information associated with the monitoring period, the serving cell may be aware of the information occasionally through other signals or reports from a UE. In this instance, calculation of a UCI code rate on a retransmitted PUSCH and rate matching associated with the corresponding retransmitted PUSCH may be set to always be performed based on $N_{SRS}=0$ or $N_{SRS}=1$ in the above described situation. This is to prevent the problem described above, which may be caused by another assumption and the embodiment of a scheduler, from occurring.

Therefore, a serving BS and a UE that performs an inter-PLMN discovery may have the same information associated with the code rate (the number of UCI symbols) of a UCI transmitted during a retransmission under the assumption provided in the environment of FIGS. 9 and 10. Accordingly, the system may avoid both an increase in the complexity of the UCI decoding operation of the BS and a waste of resources (a probability of not utilizing a last SC-FDMA symbol), and may therefore effectively utilize uplink resources, and thus, the overall system may increase uplink performance.

A method of setting the calculation of a UCI code rate and rate matching associated with a corresponding retransmitted PUSCH to be performed based on $N_{SRS}=0$ or $N_{SRS}=1$, using the retransmission timing of the corresponding PUSCH, will be described as follows.

When only one transmission block, for example, HARQ-ACK or RI information, is transmitted on a PUSCH (that is, single layer transmission), Q' may be calculated by Equation 3 provided below.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$ [Equation 3]

Here, O (alphabet O) denotes the number of RI bits or the number of HARQ-ACK bits. $M_{SC}^{PUSCH}$ is a bandwidth scheduled for a PUSCH transmission in the current subframe of a transmission block, and is expressed by the number of subcarriers. $N_{Symb}^{PUSCH-initial}$ denotes the number of SC-FDMA symbols for each subframe for an initial PUSCH transmission associated with the same transmission block. $N_{Symb}^{PUSCH-initial}$ may be calculated by Equation 3 provided below.

$$N_{symb}^{PUSCH-initial}=(2\cdot(N_{symb}^{UL}-1)-N_{SRS})$$ [Equation 4]

Here, $N_{SRS}$ has a value of 1 or 0. For example, $N_{SRS}$ may be 1 (a) when a UE configured with one or more uplink cells transmits a PUSCH and an SRS for an initial transmission in the same subframe; (b) when a PUSCH resource allocation for an initial transmission even partially overlaps a cell-specific SRS subframe and bandwidth configuration; (c) when a subframe for an initial transmission is a UE-specific type-1 SRS subframe; or (d) when a subframe for an initial transmission is a UE-specific type-0 SRS subframe and a UE is configured with Timing Advance Groups (TAGs). Otherwise, $N_{SRS}$ will be 0.

Referring again to Equation 3 $M_{SC}^{PUSCH-initial}$, C, and Kr may be obtained from an initial PDCCH (or enhanced-PDCCH [EPDCCH]) for the same transmission block. When an initial PDCCH (or EPDCCH) of downlink control information (DCI) format 0 for the same transmission block does not exist, $M_{SC}^{PUSCH-initial}$, C, and $K_r$ may be determined as follows. In one example, $M_{SC}^{PUSCH-initial}$, C, and $K_r$ may be determined from the latest semi-persistent scheduling-allocated PDCCH (or EPDCCH) when the same transmission block is semi-persistently scheduled. In another example, $M_{SC}^{PUSCH-initial}$, C, and Kr may be determined based on a random access response for the same transmission block when the PUSCH is initiated by a random access response grant.

Figure 11:
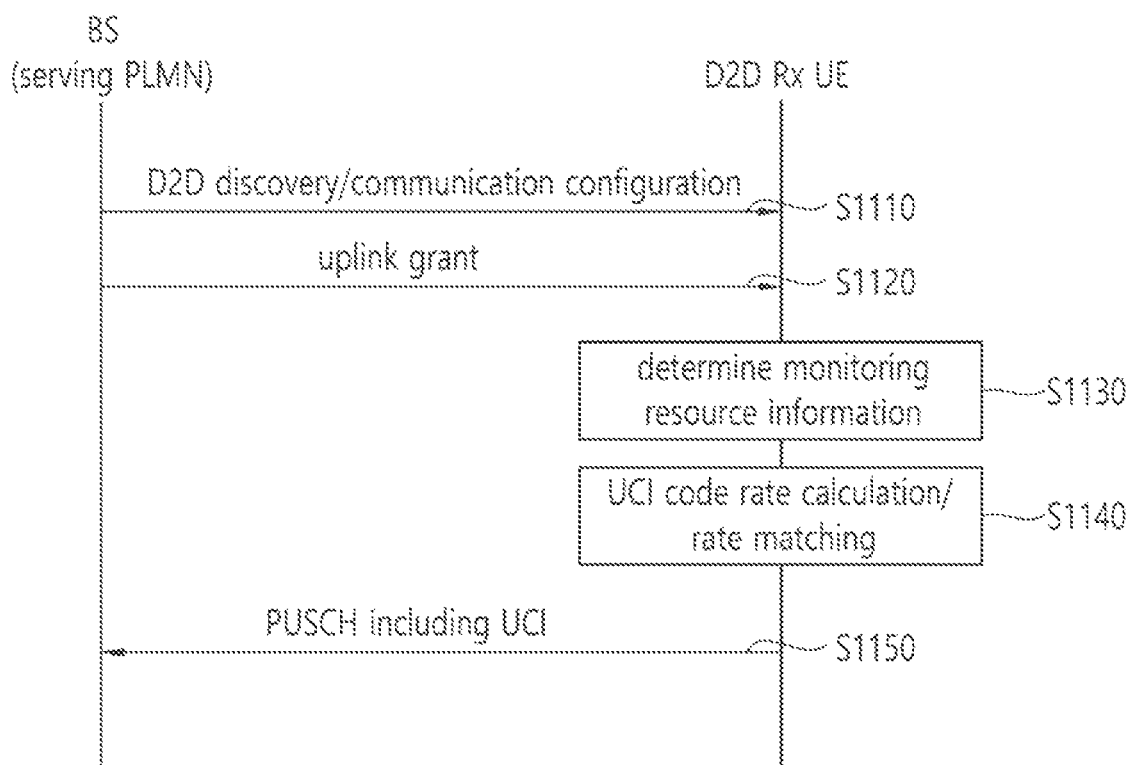
FIG. 11 is a flowchart illustrating the operations of a BS and a D2D reception UE according to an embodiment of the present disclosure.

FIG. 11 is a flowchart illustrating the operations of a BS and a D2D Rx UE according to an embodiment of the present disclosure.

Referring to FIG. 11, a BS transmits configuration information associated with D2D discovery and communication to a UE in a cell in operation S1110. The D2D configuration information may be transmitted to the UE for D2D discovery or D2D data transmission through, for example, a System Information Block (SIB) or a dedicated RRC signal. The information associated with a D2D resource pool may include information associated with a D2D signal monitoring period (monitoring resource information).

For example, monitoring resource information may include only information associated with a period for monitoring D2D signals of D2D UEs that access a single operator's network. Alternatively, the monitoring resource information may additionally include information associated with a period for monitoring D2D signals of D2D UEs that access the single operator's network, and information associated with a period for monitoring D2D signals of D2D UEs that access a different operator's network.

The BS transmits, to the UE, an uplink grant indicating transmission of a PUSCH in operation S1120.

The UE that receives the uplink grant determines monitoring resource information (information associated with a resource to be monitored by the UE for D2D communication) in operation S1130. When an indicated period for transmission of the PUSCH and SRS overlaps a resource (subframe) to be monitored, the PUSCH and SRS may not be transmitted in the corresponding period.

When the indicated period for transmission of the PUSCH and SRS is included in the resource to be monitored and a UCI transmission occurs at the same time in a retransmission PUSCH subframe, a UCI code rate for the retransmitted PUSCH is calculated and PUSCH rate matching is performed based on the above described assumption in operation S1140. The UCI code rate calculation and PUSCH rate matching are performed based on a set $N_{SRS}$ value, and $N_{SRS}$ may have a value of 1 or 0.

In operation S1140, when the UCI code rate calculation and PUSCH rate matching are performed, the UE transmits a PUSCH including the UCI to the BS in operation S1150.

Figure 12:
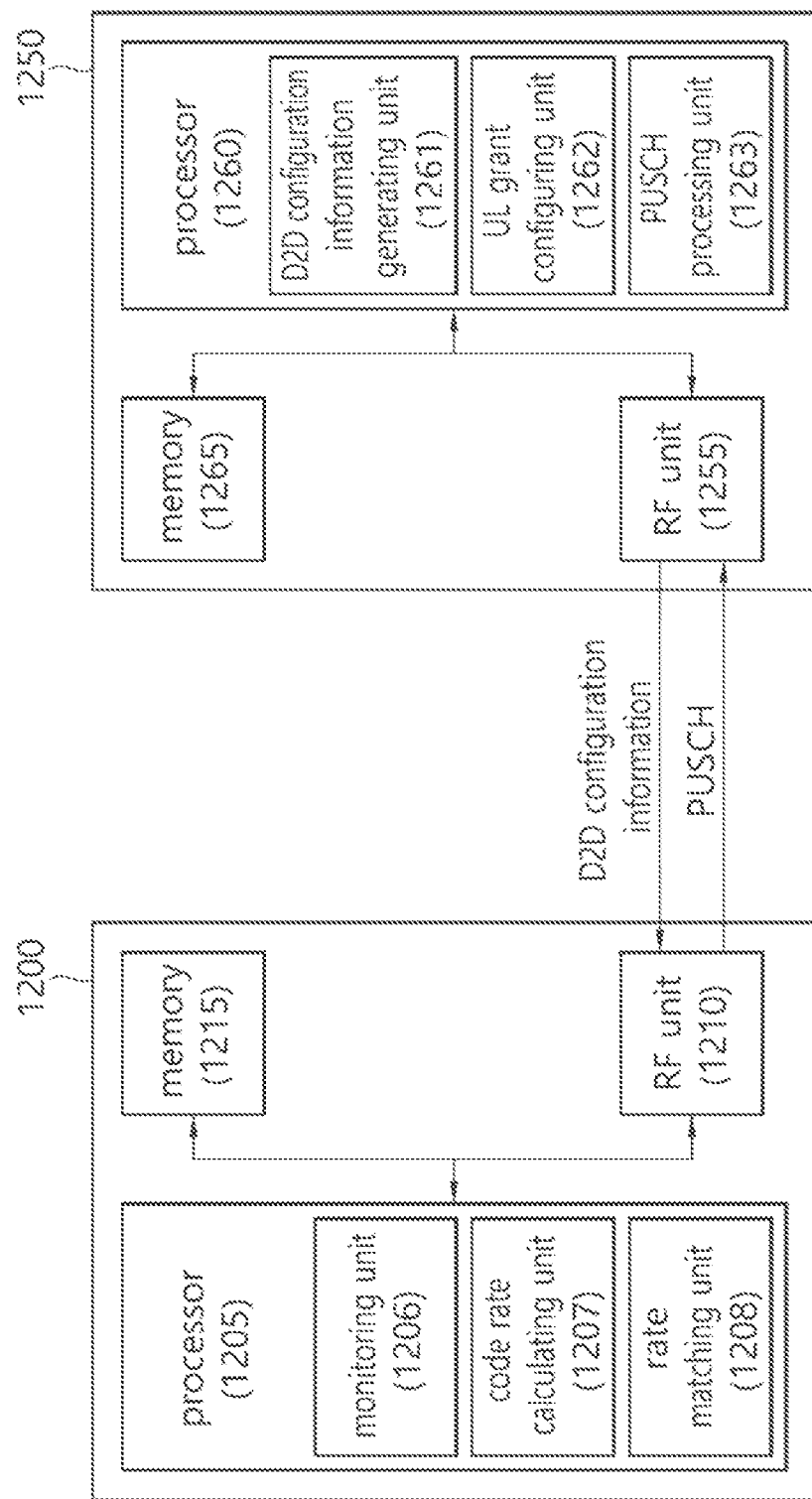
FIG. 12 is a block diagram illustrating a wireless communication system according to an embodiment of the present disclosure.

FIG. 12 is a block diagram illustrating a wireless communication system according to an embodiment of the present disclosure.

Referring to FIG. 12, a wireless communication system that supports D2D communication may include a UE 1200 and a BS (or cluster head 1250).

The UE 1200 includes a processor 1205, a Radio Frequency (RF) unit 1210, and a memory 1215. The memory 1215 is connected with the processor 1205, and stores various pieces of information for driving the processor 1205. The RF unit 1210 is connected with the processor 1205, and transmits and/or receives a radio signal. For example, the RF unit 1210 may receive, from the BS 1250, D2D configuration information disclosed in the present specifications and an uplink grant indicating a PUSCH transmission. Also, the RF 1210 unit may transmit a PUSCH to the BS 1250 using timing indicated by the uplink grant or retransmission timing.

The memory 1215 may store D2D configuration information, resource pool information for the second transmission mode, and information associated with a period for monitoring reception of a D2D signal, and may provide the information to the processor 1205 at the request of the processor 1205.

The processor 1205 may implement functions, processes, and/or methods proposed in the present specification. Particularly, the processor 1205 may implement all of the operations of FIG. 3. In one example, the processor 1205 may include a monitoring unit 1206, a code rate calculating unit 1207, and a rate matching unit 1208.

The monitoring unit 1206 may monitor a D2D signal during a monitoring period configured based on information associated with a monitoring period for D2D signal reception. The monitoring unit 1206 determines whether an uplink grant indicating a PUSCH transmission in the monitoring period is received.

The code rate calculating unit 1207 calculates a UCI code rate when an indicated period for transmission of a PUSCH is not included in the monitoring period.

The rate matching unit 1208 performs PUSCH rate matching.

Therefore, according to the present disclosure, D2D signal reception is only performed during the monitoring period and thus self-interference caused by a PUSCH transmission may not occur.

The BS 1250 includes a Radio Frequency (RF) unit 1255, a processor 1260, and a memory 1265. The memory 1265 is connected with the processor 1260, and stores various pieces of information for driving the processor 1260. The RF unit 1255 is connected with the processor 1260, and transmits and/or receives a radio signal. The processor 1260 may implement the functions, processes, and/or methods proposed in the present specifications. In the above described embodiments, the operations of the BS 1250 may be implemented by the processor 1260. The processor 1260 generates D2D configuration information disclosed in the present specification, configures an uplink grant that indicates a PUSCH transmission, and processes a PUSCH received from a UE.

To this end, the processor 1260 includes a D2D configuration information generating unit 1260, a UL grant configuring unit 1262, and a PUSCH processing unit 1263. The D2D configuration information generated by the D2D configuration information generating unit 1261 may include information associated with a D2D resource pool for the second transmission mode. The information associated with the D2D resource pool may include information associated with a D2D signal monitoring period (monitoring resource information).

The monitoring resource information may include only information associated with a period for monitoring D2D signals of D2D UEs that access a single operator's network, or may additionally include both information associated with a period for monitoring D2D signals of D2D UEs that access a single operator's network and information associated with a period for monitoring D2D signals of D2D UEs that access a different operator's network.

The UL grant configuring unit 1262 configures an uplink grant indicating transmission of a PUSCH. The RF unit 1255 transmits, to the UE 1200, an uplink grant configured by the UL grant configuring unit 1262. The UE 1200 that receives the uplink grant transmits the PUSCH and SRS using timing indicated by the uplink grant or retransmission timing, based on monitoring resource information. The PUSCH processing unit 1263 processes the PUSCH received through the RF unit 1255.

An Automatic Repeat Request (ARQ) is a technology used for increasing reliability of radio communication. According to ARQ, a transmitter retransmits a data signal when a receiver fails to receive a data signal. Hybrid Automatic Repeat Request (HARQ) is a combination of Forward Error Correction (FEC) and ARQ. A receiver that uses HARQ basically attempts error correction with respect to a received data signal, and determines whether to execute retransmission using an error detection code. The error detection code may use a Cyclic Redundancy Check (CRC). When an error in a data signal is not detected through the CRC detection process, the receiver determines that decoding the data signal was successful. In this instance, the receiver transmits an Acknowledgement (ACK) signal to the transmitter. When an error in a data signal is detected through the CRC detection process, the receiver determines that decoding the data signal has failed. In this instance, the receiver transmits a Not-Acknowledgement (NACK) signal to the transmitter. The transmitter may retransmit a data signal when the NACK signal is received.

A BS transmits a PDCCH including a UL grant for a PUSCH transmission of a UE; the UE transmits UL data through a PUSCH using determined timing; and the BS transmits a HARQ ACK/NACK with respect to the UL data through a PHICH using determined timing. UL HARQ refers to a process that repeats the above process until the UE receives an ACK signal from the BS.

The MAC layer may control a HARQ process, may execute mapping between a logical channel and a transport channel, and may execute multiplexing or demultiplexing of a MAC Service Data Unit (SDU) that belongs to the logical channel of transport blocks (TBs) provided to a physical channel on a transport channel. The MAC layer may provide a service to an RLC layer through a logical channel. The logical channel is classified into a control channel for transferring control area information and a traffic channel for transferring user area information. For example, services provided from the MAC layer to a higher layer include a data transfer service or a radio resource allocation service.

Figure 13:
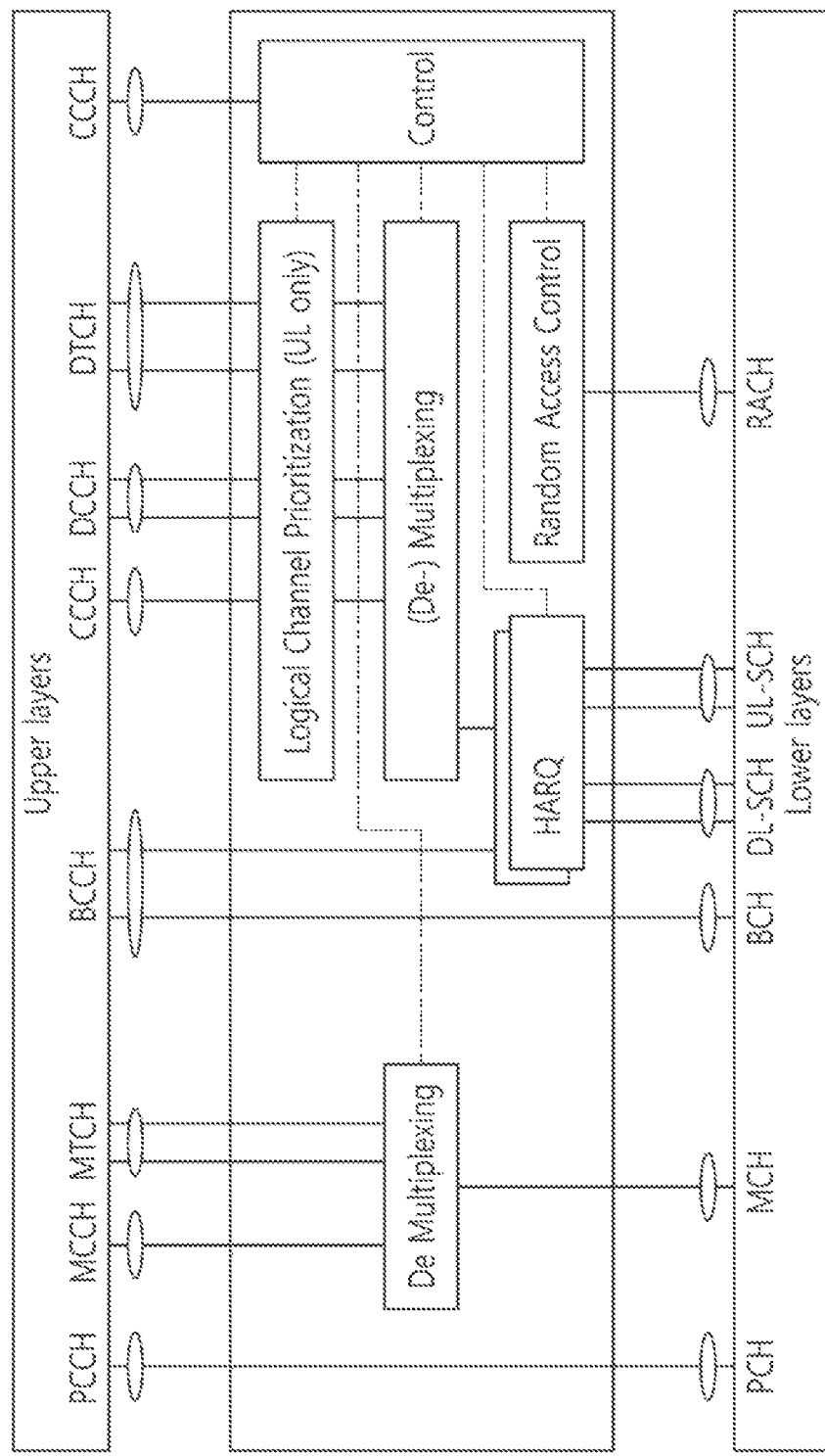
FIG. 13 is a diagram illustrating the structure of an MAC entity of a UE.

FIG. 13 is a diagram illustrating a structure of an MAC entity of a UE.

Referring to FIG. 13, an MAC entity may perform various functions, such as logical channel prioritization, multiplexing/demultiplexing, HARQ, random access controlling, or the like. Particularly, the MAC entity performs mapping between logical channels and transport channels, and may perform multiplexing of MAC SDUs onto transport blocks (TBs) to be delivered to the physical layer on the transport channels from one or various (different) logical channels. The MAC entity may perform demultiplexing of MAC SDUs onto transport blocks (TBs) delivered from the physical layer on transport channels from one or various (different) logical channels. The MAC entity may perform scheduling information reporting. The MAC entity may perform error correction through HARQ. In this instance, a part that performs the error correction through HARQ may be referred to as a HARQ entity. Also, the MAC entity may handle prioritization among UEs through dynamic scheduling, and the MAC entity may handle prioritization among logical channels of a single UE. The MAC entity may perform logical channel prioritization, and may select a transport format.

The MAC entity may receive, from a lower physical layer, a data transmission service, a HARQ feedback signal, a scheduling request signal, a measurement (e.g., channel quality indication [CQI]), or the like, and may process the same.

Recently, a method of supporting D2D communication has been considered, wherein UEs utilize transmission/reception technologies of a wireless communication system in the frequency band of the wireless communication system or in other bands, and directly exchange user data between the UEs without passing through infrastructure (for example, a BS). D2D communication may allow wireless communication in an area outside that covered by limited wireless communication infrastructure, and may reduce load on the network of the wireless communication system. Also, D2D communication may provide disaster information to UEs even when BSs do not operate smoothly in war or disaster situations, which is an advantage.

A UE that transmits a signal based on the D2D communication is defined as a transmission UE (Tx UE), and a UE that receives a signal based on the D2D communication is defined as a reception UE (Rx UE). The Tx UE transmits a discovery signal, a D2D control signal, or a D2D data signal. The Rx UE receives a discovery signal, a D2D control signal, or a D2D data signal. The Tx UE and the Rx UE may operate by exchanging their roles. A signal transmitted by the Tx UE may be received by two or more Rx UEs. Alternatively, signals transmitted by two or more Tx UEs may be selectively received by a single Rx UE. A D2D signal may be transmitted through an uplink resource. Therefore, a D2D signal may be mapped to an uplink subframe and may be transmitted from the Tx UE to the Rx UE. The Rx UE may receive a D2D signal on the uplink subframe.

Figure 14:
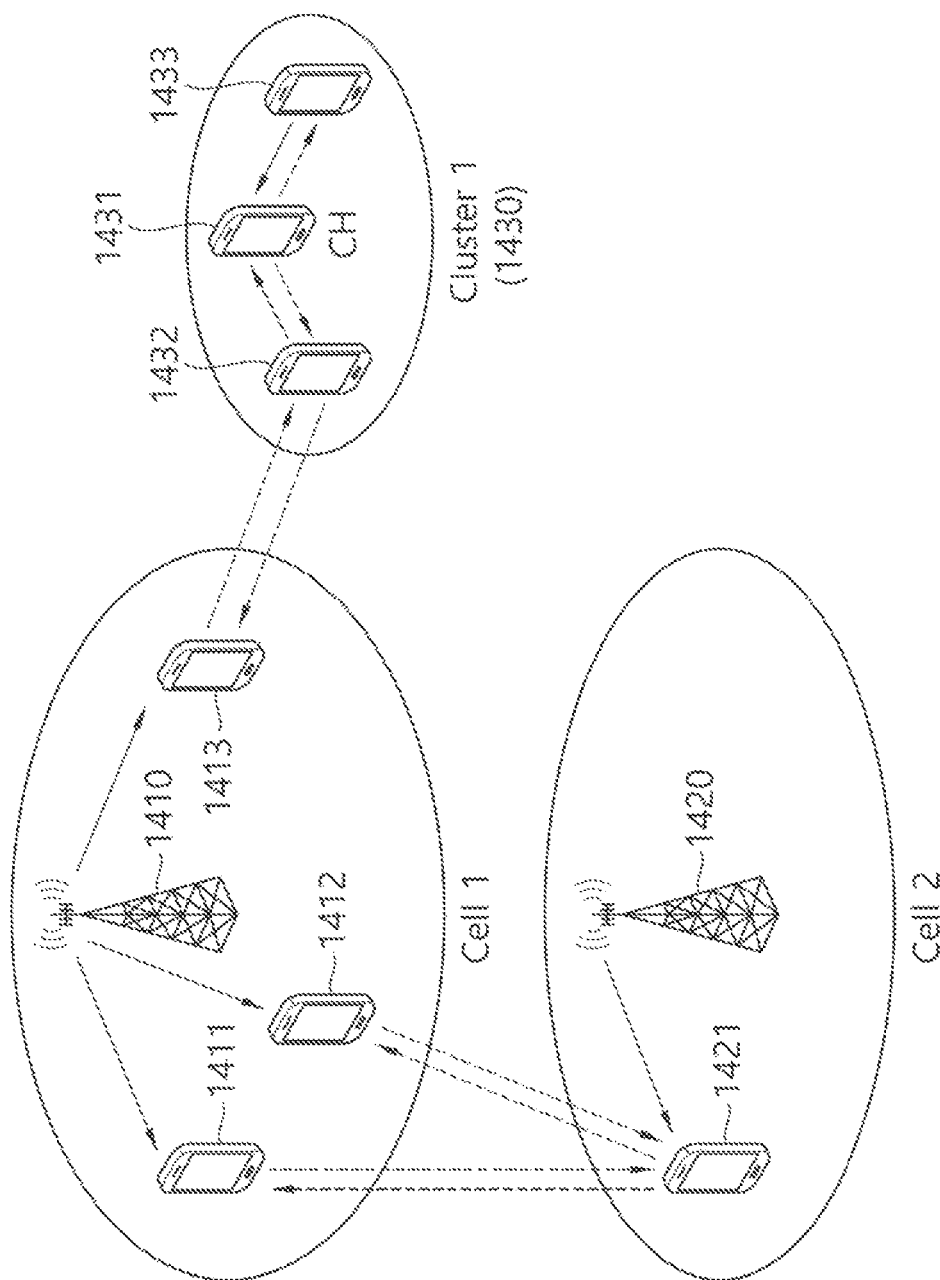
FIG. 14 is a diagram illustrating the concept of cellular network-based D2D communication according to the present disclosure.

FIG. 14 is a diagram illustrating the concept of cellular network-based D2D communication according to the present disclosure.

Referring to FIG. 14, a cellular communication network including a first BS 1410, a second BS 1420, and a first cluster 1430 is configured. A first UE 1411 and a second UE 1412 included in a cell provided by the first BS 1410 may execute communication through a general access link (cellular link) through the first BS 1410. This is an in-coverage-single-cell D2D communication scenario. The first terminal 1411 included in the first BS 1411 may execute D2D communication with a fourth UE 1421 included in the second BS 1420. This is an in-coverage-multi-cell D2D communication scenario. Also, a fifth UE 1431 belonging outside of a network coverage area may generate the single cluster 1430 with a sixth UE 1432 and a seventh UE 1433, and may perform D2D communication with them. This is an out-of-coverage D2D communication scenario. Here, the fifth UE 1450 may operate as a cluster head (CH) of a first cluster. A cluster head is a UE (or unit) used as a reference for at least the purpose of synchronization and, occasionally, allocates a resource for different purposes. The cluster header may include an Independent Synchronization Source (ISS) for the synchronization of an out-of-coverage UE. Also, the third UE 1413 may perform D2D communication with the sixth UE 1432, which corresponds to a partial-coverage D2D communication scenario.

D2D communication may include direct communication that directly transmits and receives D2D control information and/or user data. To support the D2D communication, a D2D discovery procedure and a D2D synchronization procedure may be executed. D2D communication may be used for various purposes. For example, D2D communication within a network coverage area and D2D communication outside a network coverage area may be used for public safety. D2D communication outside a network coverage area may be used for only the public safety.

To perform D2D data transmission/reception through D2D communication, D2D control information needs to be transmitted/received between UEs. D2D control information may be referred to as a Scheduling Assignment (SA) or D2D SA. A D2D Rx UE may perform a D2D data reception based on the SA. The SA may include, for example, at least one out of: New Data Indicator (NDI), a Target Identification (target ID), a Redundancy Version (RV) indicator, a Modulation and Coding Scheme (MCS) indication, a Resource Pattern for Transmission (RPT) indication, and a power control indication.

Here, the NDI indicates whether a current transmission is a repetition of data, that is, a retransmission, or a new transmission. A receiver may combine the same data based on the NDI. The target ID indicates an ID of a terminal to which a corresponding data MAC PDU is intended to be transmitted. The data MAC PDU may be transmitted through group casting or broadcasting based on the ID value, and may be transmitted even through uni-casting based on the settings. The RV indicator indicates a redundancy version by specifying different start points in a circular buffer for encoded buffer reading. A Tx UE may choose various redundancy versions associated with a repeated transmission of the same packet, based on the RV indicator. The MCS indication indicates an MCS level for D2D communication. However, an MCS for D2D communication (e.g., SA or data) may be fixed to QPSK. The RPT indication indicates a time/frequency physical resource in which corresponding D2D data is allocated and transmitted. The power control indication is an instruction used when a UE that receives corresponding information controls the magnitude of power to be appropriate for a corresponding D2D transmission.

From the perspective of a Tx UE, the Tx UE may perform resource allocation for D2D communication in two modes.

In mode 1 a BS or a relay node (hereinafter a BS includes a relay node) schedules a predetermined resource(s) for D2D communication. That is, in mode 1, a predetermined resource(s) used for transmitting D2D data and D2D control information from a Tx UE may be designated by a BS or by a relay node. In Mode 2 a UE directly selects a predetermined resource(s) from a resource pool. That is, in mode 2, a Tx UE directly selects a predetermined resource(s) to be used for transmitting D2D data and D2D control information.

A D2D communication-enabled UE must support mode 1 for in-coverage D2D communication. A D2D communication-enabled UE may support mode 2 for out-of-coverage or edge-of-coverage D2D communication.

In mode 1, the location of a resource(s) for a D2D control information transmission and the location of a resource(s) for a D2D data transmission are given by a BS. That is, when the BS gives a UE the same grant for D2D SA and data transmission, the BS transmits an (E)PDCCH in a DCI message format having a size identical to that of DCI format 0. In mode 2, a resource pool for transmission of D2D control information (e.g., SA) may be pre-configured and/or may be semi-statically allocated. In this instance, a Tx UE may select a resource for D2D control information from the resource pool, for transmission of the D2D control information.

D2D discovery may be performed on a D2D discovery resource. For example, a D2D UE may transmit a discovery signal through a randomly selected discovery resource (hereinafter referred to as a D2D discovery resource), within each discovery period. For example, a discovery period and a discovery resource in a network coverage area may be configured by a BS. Outside the network coverage area, a discovery resource may be selected based on a period and an offset set by a Tx UE, or a discovery resource may be selected based on a pre-configured (or configured) nominal transmission probability or a fixed (or adaptive) transmission probability. A single D2D discovery resource may consist of n contiguous PRBs in the frequency domain and a single subframe. In this instance, inter-slot frequency hopping may not be performed in the subframe. n may be, for example, 2 or 3. A set of D2D resources may be used for a repeated transmission of a Medium Access Control Protocol Data Unit (MAC PDU) that delivers a discovery signal (hereinafter referred to as a discovery MAC PDU) within a discovery period. A plurality of D2D discovery resource sets may exist within a single discovery period, and D2D discovery resources in a single D2D discovery resource set may be contiguous or non-contiguous in the time domain, and may be deployed based on frequency hopping in the frequency axis (inter-subframe frequency hopping). From the perspective of an Rx UE, a discovery signal may be monitored in a resource pool for D2D reception.

A D2D discovery period may be classified as type 1 or type 2B according to a discovery period. Type 1 indicates periodicity of resources allocated for D2D discovery signal transmission within a cell. Type 2B indicates periodicity of resources for D2D signal reception from a cell. Multiple discovery periods having various lengths may be used. In type 2B, a network may configure a predetermined resource for transmission of a D2D discovery signal.

D2D discovery and communication may be operated independently from a Wide Area Network (WAN). In some instances, WAN signal is transmitted to a D2D UE from a BS through a DL spectrum and, at the same time, a D2D signal may be transmitted from another UE. A Wide Area Network (WAN) refers to a network that configures a wide coverage area in an existing cellular network and provides mobile UEs with voice/data traffic, and may include, for example, WCDMA, LTE, WiMax, and the like. A radio access network as described above is generally referred to as a WAN. A UE having a single transceiver chain is incapable of transmitting or receiving signals through multiple frequency bands at the same time. Therefore, when a WAN signal is transmitted from a BS through a DL spectrum and a D2D signal is simultaneously transmitted from another UE, prioritization of signals to be processed must be defined, and handling of low-priority signals must also be defined.

Particularly, the present disclosure intensively describes a method of handling a case in which a D2D (Rx) resource pool for D2D signal reception and the reception timing of a PHICH that carries a HARQ-ACK signal overlap in the time axis.

When a D2D (Rx) resource pool is configured (e.g., type 1/2 D2D discovery) in the reception timing of a (WAN) PHICH in response to a PUSCH transmission, a D2D UE having a single transceiver chain may receive a D2D signal (e.g., D2D discovery, SA, or D2D data), and may not receive a PHICH. Particularly, when a D2D signal corresponds to a type 1/2 discovery Tx/Rx signal, a mode 2 SA Tx/Rx signal, or the like, the corresponding D2D signal may have a higher priority than a DL signal (e.g., PHICH) on a WAN DL spectrum.

Figure 15:
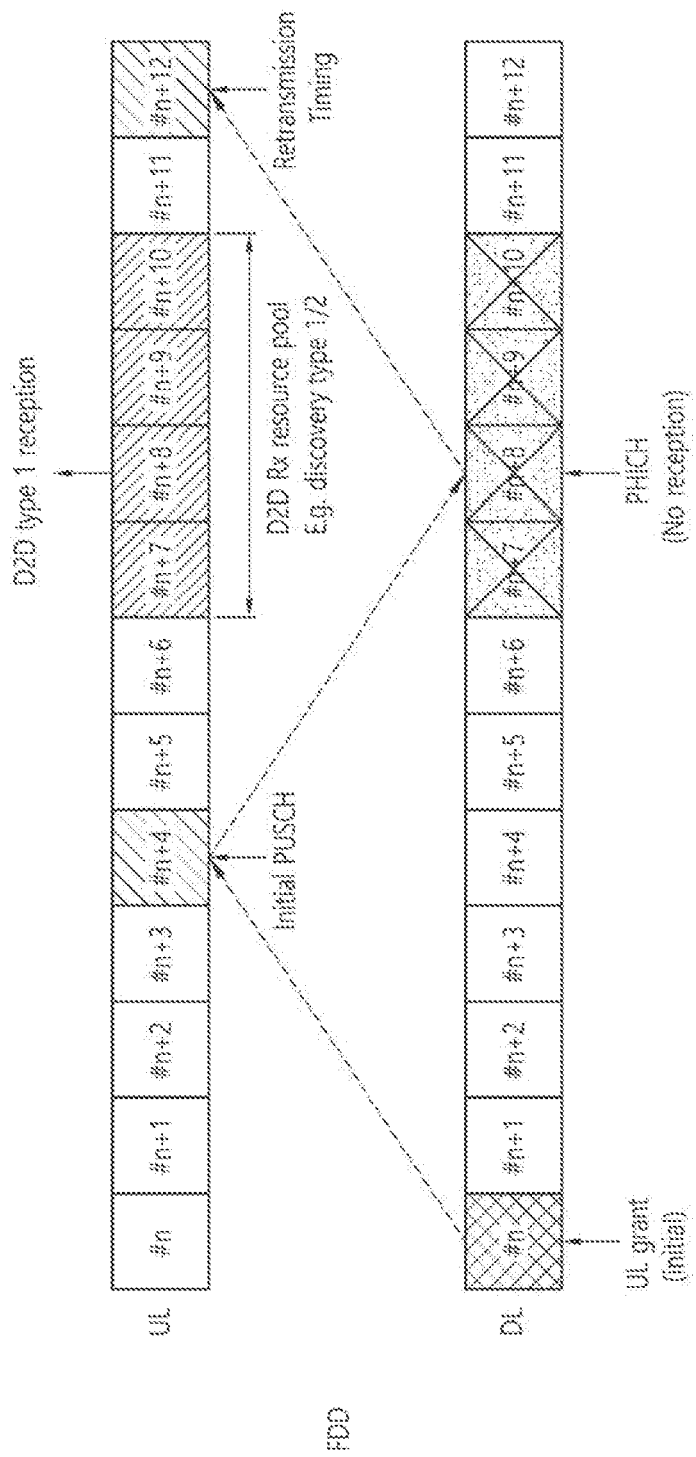
FIG. 15 is a diagram illustrating an example of a DL subframe in which a UE is incapable of receiving a PHICH.

FIG. 15 is a diagram illustrating an example of a DL subframe in which a UE is incapable of receiving a PHICH according to the present disclosure. FIG. 15 assumes a case in which an uplink transmission and a downlink transmission are based on a Frequency Division Duplex (FDD) scheme.

Referring to FIG. 15, UL subframes #n+7 to #n+10 are configured as a D2D Rx resource pool (i.e., a monitoring period for a D2D signal hereinafter referred to as a D2D monitoring period), and a UE can receive an initial UL grant that indicates a PUSCH transmission in a UL subframe #n+4 from a BS (or a network) in a subframe #n. Here, the D2D monitoring period may include a Tx/Rx resource set/resource pool for D2D discovery or D2D communication. The UE transmits an initial PUSCH to the BS in the UL subframe #n+4 based on the UL grant. The BS generates a HARQ ACK/NACK signal indicating whether the PUSCH was successfully received and transmits the same to the UE in a DL subframe #n+8. In a WAN system, UL HARQ supports a synchronized HARQ. That is, it is indicated that the timing of an initial UL grant transmission from the BS, the timing of a UL data transmission from the UE, and the timing of a HARQ ACK/NACK signal indication made by the BS are all predetermined.

However, as described above, the UL subframes #n+7 to #n+10 are configured as a D2D monitoring period and the UE needs to receive (or perform blind decoding of) a D2D signal, and thus, the UE may not expect reception of a PHICH in the DL subframe #n+8. Originally, the UE was supposed to obtain HARQ ACK/NACK information based on a PHICH received in a physical layer of a UL subframe #n+8, which was based on a synchronized UL HARQ timing, and to transmit the HARQ ACK/NACK information to a higher layer (e.g., a MAC layer). However, the UE fails to receive the PHICH in the UL subframe #n+8 and thus may not properly perform a UL HARQ procedure. This is similar to the case in which a measurement gap is configured for the UE.

Figure 16:
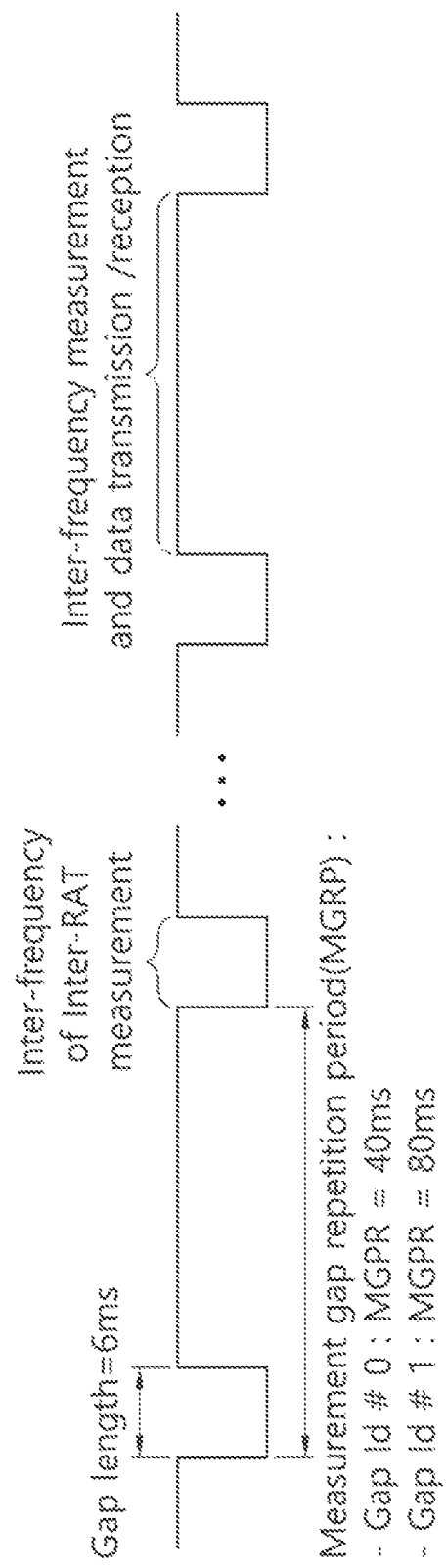
FIG. 16 is a diagram illustrating an example of a measurement gap in a WAN system.

FIG. 16 is a diagram illustrating an example of a measurement gap in a WAN system according to the present disclosure.

Generally, a UE performs measurement in order to recognize whether neighboring cells exist, an intensity of a signal, and the like. In this instance, neighboring cells existing in the intra-frequency zone can transmit a signal through the same frequency band as that of a current serving cell. Therefore, the UE is capable of performing measurements in association with neighboring cells, while proceeding with transmission and reception in the serving cell. However, neighboring cells existing in the inter-frequency zone transmit a signal through a frequency band different from that of the serving cell and thus, the UE temporally interrupts the transmission and reception executed with the current serving cell during the measurement gap, retunes a Radio Frequency (RF) chain, and receives a signal associated with a frequency band that is recognized to have a probability of including neighboring cells. The UE may perform a measuring operation with respect to neighboring cells existing in the inter-frequency zone by utilizing a periodic measurement gap unless the UE has more than one (Rx) RF chain.

The measurement gap may be classified as a first gap pattern that is repeated based on a period of 40 ms and has a length of 6 ms, and a second gap pattern that is repeated based on a period of 80 ms and has a length of 6 ms. Generally, a network may configure one of the two patterns for the UE.

A trade-off exists between the first pattern and the second pattern in Table 1. The first pattern has a short period but affects a WAN transmission and reception through a serving cell. Conversely, the second pattern has a longer period than the first pattern, but less frequently affects the WAN transmission and reception through the serving cell.

A UE may not transmit any data to the BS during a measurement gap. Also, a UE may not expect tuning of an (Rx) RF chain to a WAN carrier frequency during a measurement gap. That a UE is incapable of receiving a WAN signal during a measurement gap, is similar to the case in which a UE is incapable of receiving a WAN signal during a D2D monitoring period.

Due to a period or a gap where reception of a WAN signal (e.g., PHICH) is not allowed (or is not expectable) as described above, the UE does not receive a WAN signal which is transmitted based on predetermined timing. Therefore, there is a desire for a method for handling the same.

The present disclosure proposes a method of handling a corresponding UL HARQ procedure under the assumption that the WAN signal includes a PHICH that carries a HARQ-ACK.

Figure 17:
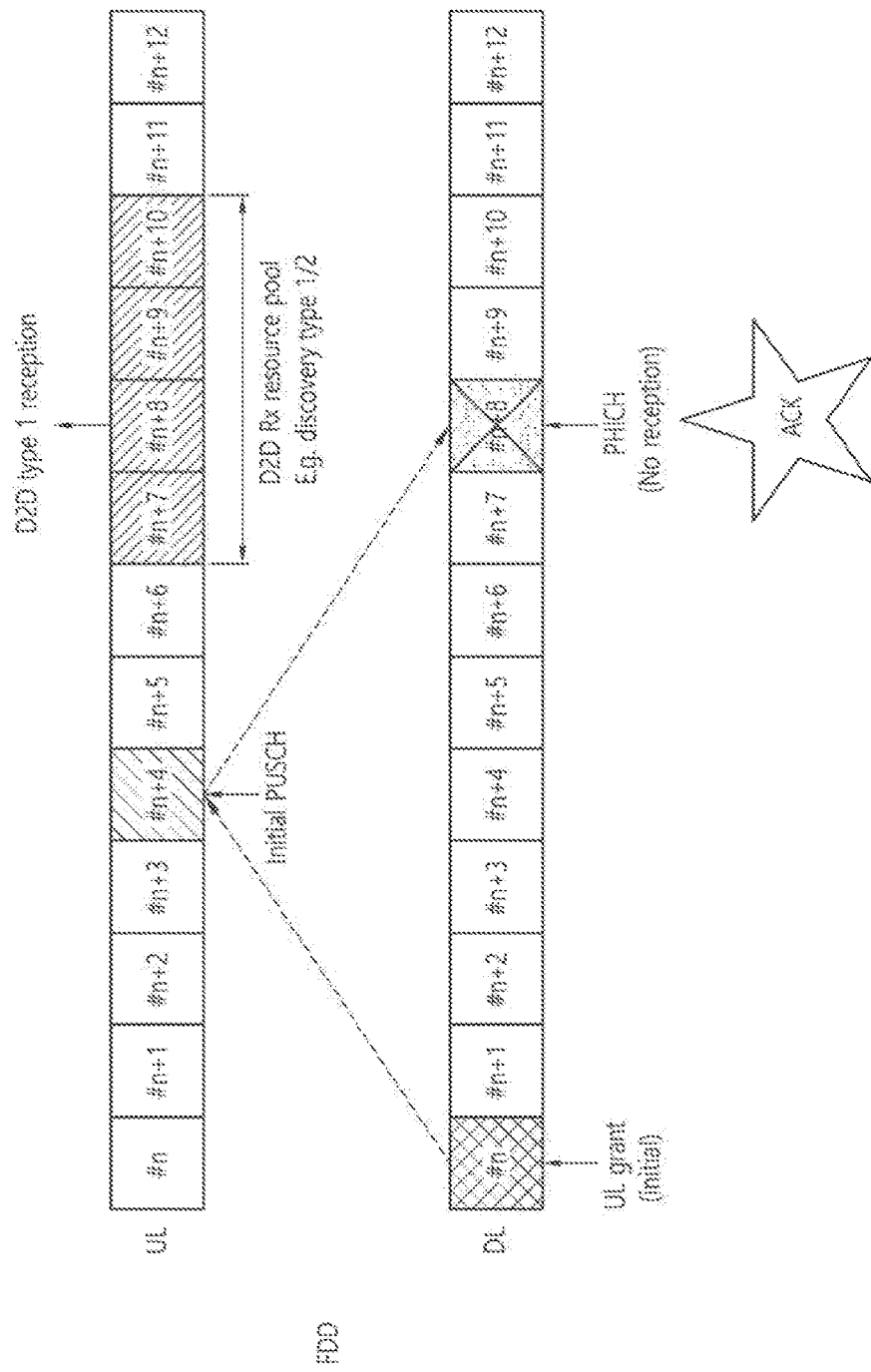
FIG. 17 is a diagram illustrating a UL HARQ operation according to an embodiment of the present disclosure.

FIG. 17 is a diagram illustrating a UL HARQ operation according to an embodiment of the present disclosure.

Referring to FIG. 17, when PHICH reception timing overlaps a D2D monitoring period, the UE will determine that a corresponding PHICH indicates ACK. That is, although the UE will fail to receive a PHICH, the UE may assume that a BS successfully received a PUSCH transmitted in a UL subframe #+4.

For example (alt 1-1), D2D discovery (type 1/2B) or D2D communication (mode 1/2) is configured or enabled for the UE and a DL subframe (e.g., DL subframe #n+8) associated with PHICH reception in response to a previous PUSCH transmission overlaps a D2D monitoring period (a Tx/Rx resource set/resource pool for D2D discovery or D2D communication), the corresponding UE does not expect a PHICH reception in the corresponding DL subframe, and transfers an ACK signal with respect to a transmission block (TB) associated with the PUSCH to a higher layer (MAC layer). This may be executed in a physical (PHY) layer of the UE.

This is a method in which the UE always regards that ACK is indicated for a corresponding TB and transfers the ACK information to a higher layer (MAC layer) from the PHY layer even though the UE fails to receive a PHICH because PHICH reception timing and a D2D monitoring period overlap. This is a method for the physical layer of the UE to always transfer ACK to a higher layer and to process a UL HARQ procedure because the BS has a high probability of successfully receiving a PUSCH transmission (that is, ACK). As a matter of course, NACK may be included in the corresponding PHICH. In this instance, this may be covered based on an ARQ operation of an RLC layer.

In another example (alt 1-2), when D2D discovery (type 1/2B) or D2D communication (mode 1/2) is configured or enabled, a DL subframe (e.g., DL subframe #n+8) associated with a PHICH reception in response to a previous PUSCH transmission overlaps a D2D monitoring period (a Tx/Rx resource set/resource pool for D2D discovery or D2D communication), and a MAC PDU for the corresponding PUSCH transmission is not obtained from an Msg3 buffer, "HARQ_FEEDBACK", which is a state variable associated with a HARQ process (in MAC) of the corresponding UE, is set to ACK. This may be performed in a MAC layer (or MAC entity) of the UE. Here, the Msg3 buffer is a buffer for transmitting Msg3, and a MAC PDU may be generated in the Msg3 buffer according to a UL grant (in PDSCH) received based on a Random Access Response (by PDCCH) in a random access procedure. That is, the present embodiment indicates that the MAC PDU for a PUSCH transmission is different from the MAC PDU generated in a random access procedure.

This is a method of processing a HARQ procedure by the MAC layer which acts as a main body. When an ACK/NACK signal transferred from the PHY layer does not exist, the HARQ procedure may be processed through the operations of the MAC layer proposed above.

Figure 18:
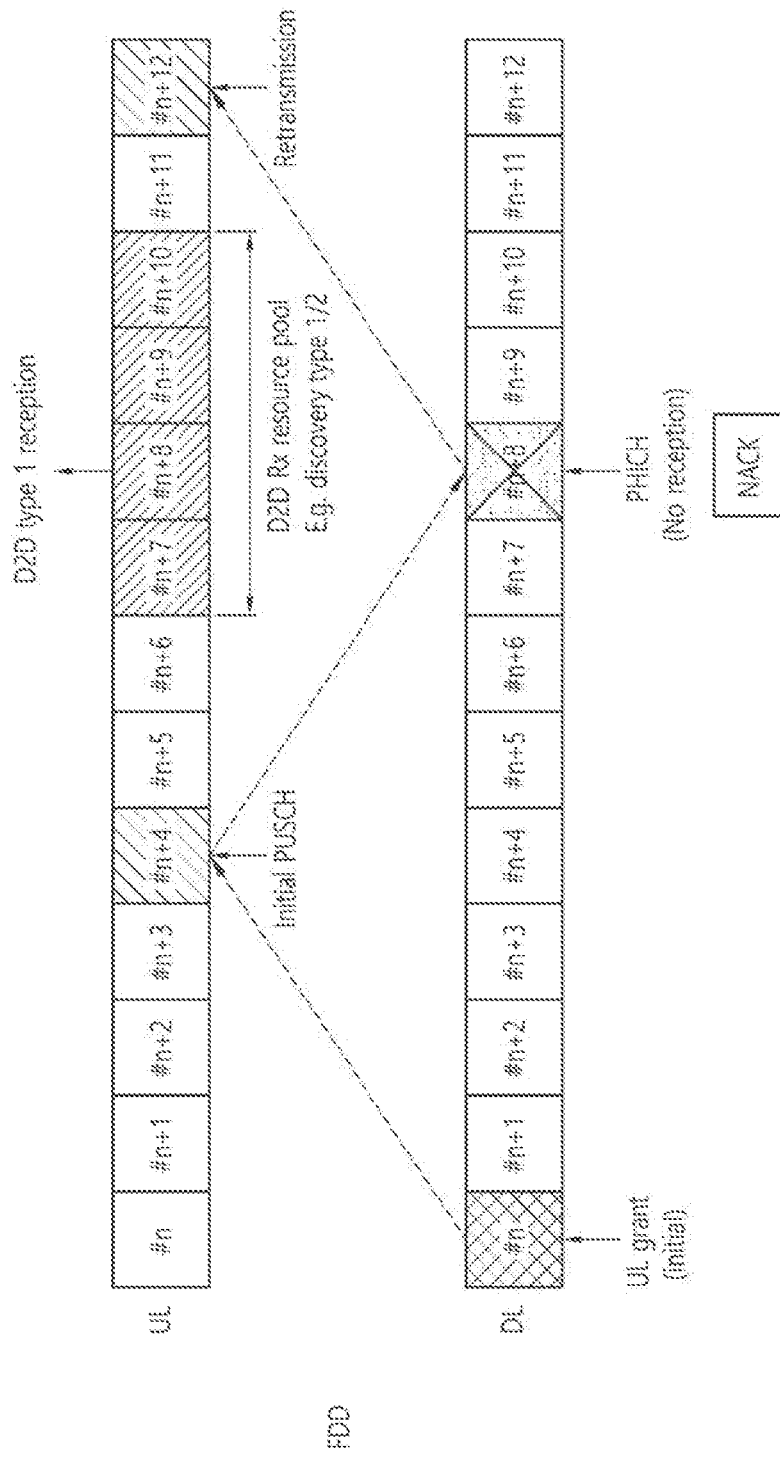
FIG. 18 is a diagram illustrating a UL HARQ operation according to another embodiment of the present disclosure.

FIG. 18 is a diagram illustrating a UL HARQ operation according to another embodiment of the present disclosure.

Referring to FIG. 18, when PHICH reception timing overlaps a D2D monitoring period, a UE may determine that a corresponding PHICH indicates NACK. That is, even though the UE failed to receive the PHICH, the UE may assume that a BS failed to successfully receive a PUSCH transmitted in a UL subframe #+4.

For example (alt 2-1), when D2D discovery (type 1/2B) or D2D communication (mode 1/2) is configured or enabled for the UE and when a DL subframe (e.g., DL subframe #n+8) associated with a PHICH reception in response to a previous PUSCH transmission overlaps a D2D monitoring period (a Tx/Rx resource set/resource pool for D2D discovery or D2D communication), the corresponding UE does not expect PHICH reception in the corresponding DL subframe, and transfers a NACK signal with respect to a transmission block (TB) associated with the PUSCH to a higher layer (MAC layer). This may be executed in a physical (PHY) layer of the UE.

As another example (alt 2-2), when D2D discovery (type 1/2B) or D2D communication (mode 1/2) is configured or enabled, a DL subframe (e.g., DL subframe #n+8) associated with PHICH reception in response to a previous PUSCH transmission overlaps a D2D monitoring period (a Tx/Rx resource set/resource pool for D2D discovery or D2D communication), and a MAC PDU for the corresponding PUSCH transmission is not obtained from an Msg3 buffer, a HARQ entity indicates/performs a non-adaptive retransmission associated with the corresponding PUSCH with predetermined timing. This may be performed in a MAC layer (or MAC entity) of the UE. Here, the non-adaptive retransmission indicates retransmission of the corresponding PUSCH based on the same format as the previous transmission (e.g., the same MAC level, transmission power, and the like).

In this instance, without a separate indication from the physical layer, the MAC layer may indicate/performs non-adaptive retransmission. Although the BS actually indicates ACK through the PHICH, the UE will perform a PUSCH retransmission. This assumes a case in which the BS fails to receive a previous PUSCH transmission and indicates NACK through a PHICH, thereby preventing unnecessary packet loss in a higher layer (RLC layer). This may be appropriate for system operation that is conservative or that prioritizes reliability.

The above described operations according to the present disclosure may be applied to a multi-carrier environment, particularly, a carrier aggregation (CA) environment.

Figure 19:
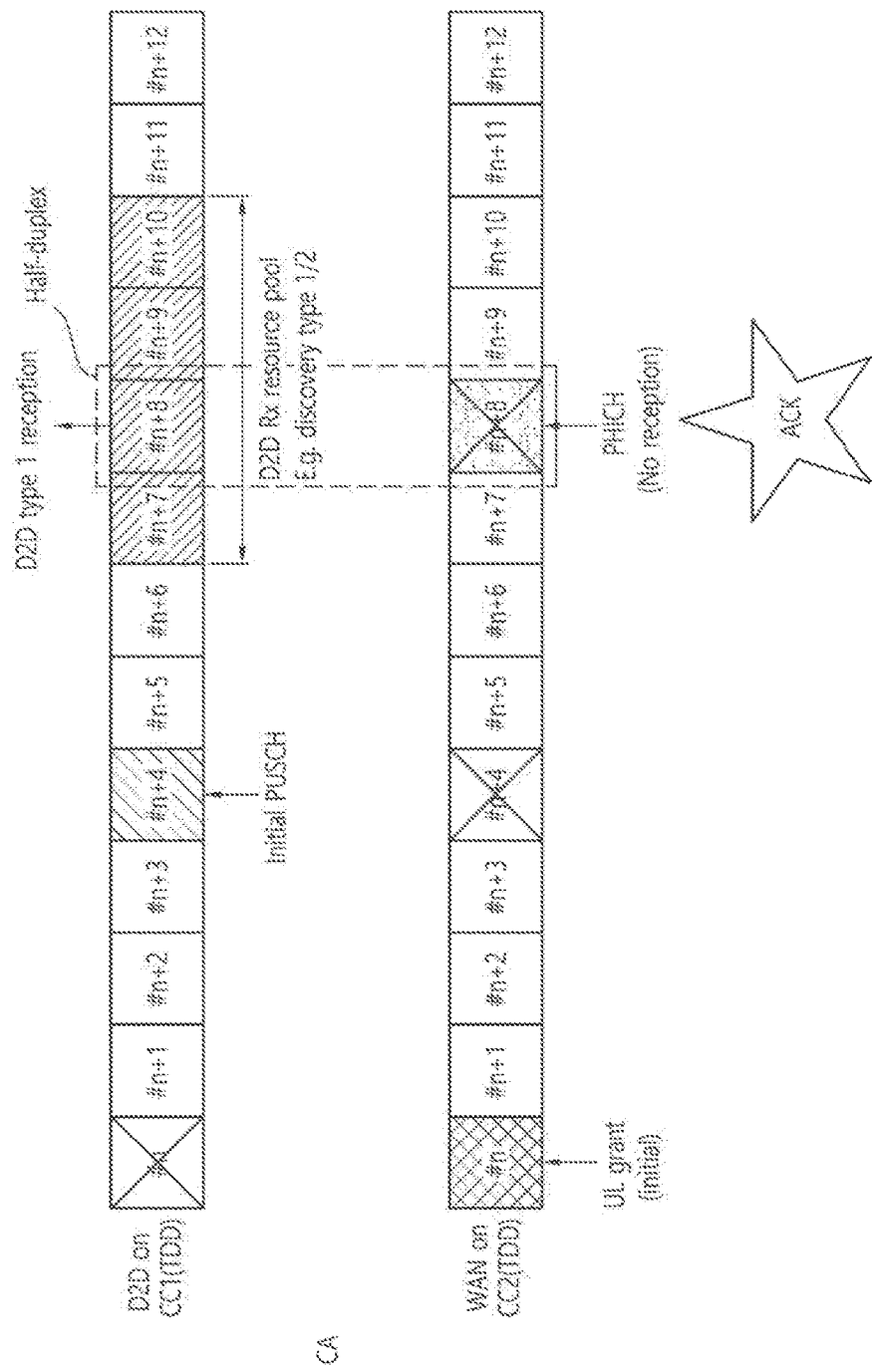
FIGS. 19 and 20 are diagrams illustrating UL HARQ operations in a system in which carrier aggregation is configured.
Figure 20:
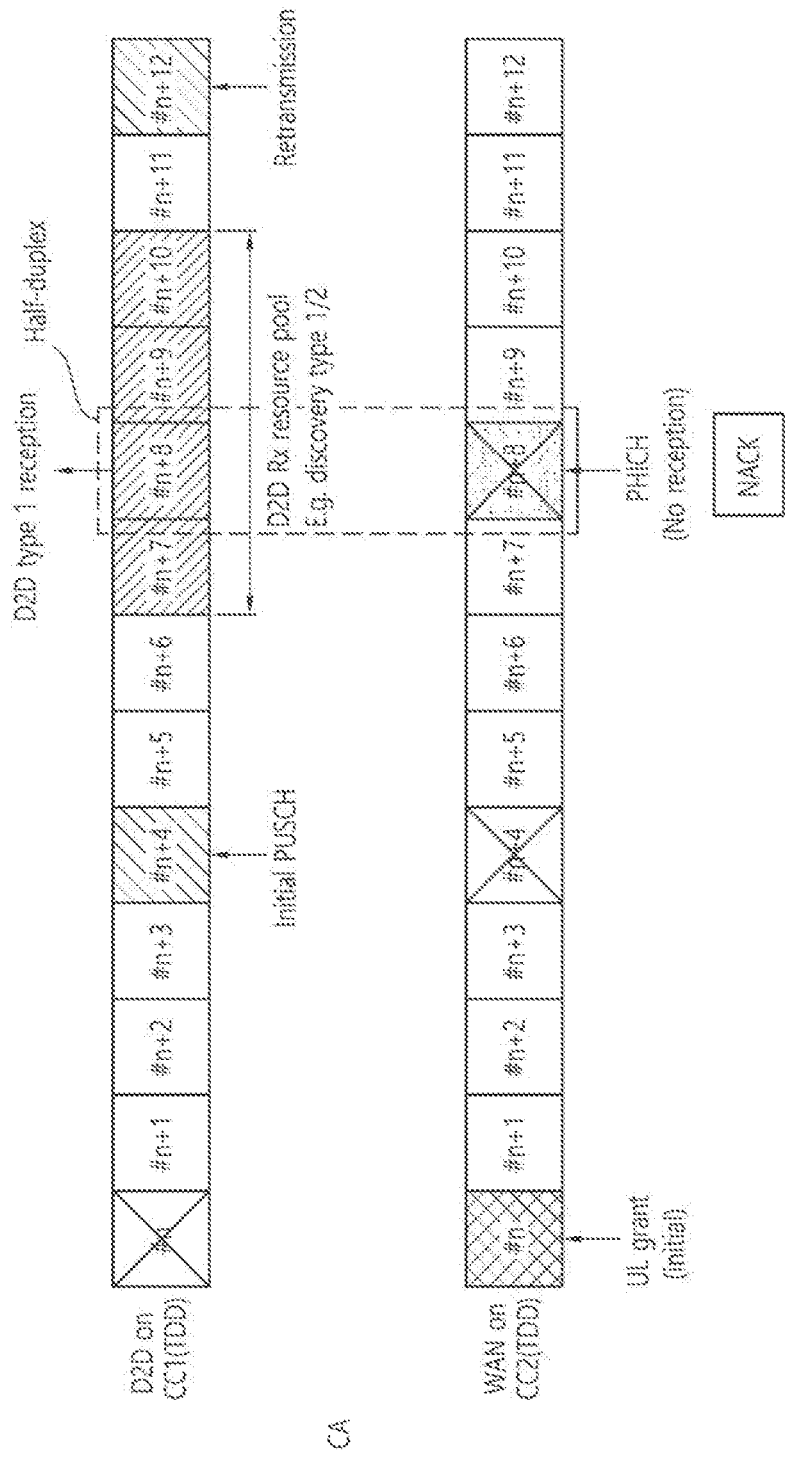

FIGS. 19 and 20 are diagrams illustrating UL HARQ operations in a system in which carrier aggregation is configured.

As illustrated in FIGS. 19 and 20, when a D2D UE operates based on half duplex in a plurality of carriers in TDD, PHICH reception and D2D transmission may overlap in the time axis and a PHICH may not be received (according to the half duplex rule). In this instance, a UE determines that the corresponding PHICH indicates ACK (FIG. 19), and may perform a UL HARQ operation based on the same. Alternatively, the UE determines that the corresponding PHICH indicates NACK (FIG. 20), and may perform a UL HARQ operation based on the same.

Figure 21:
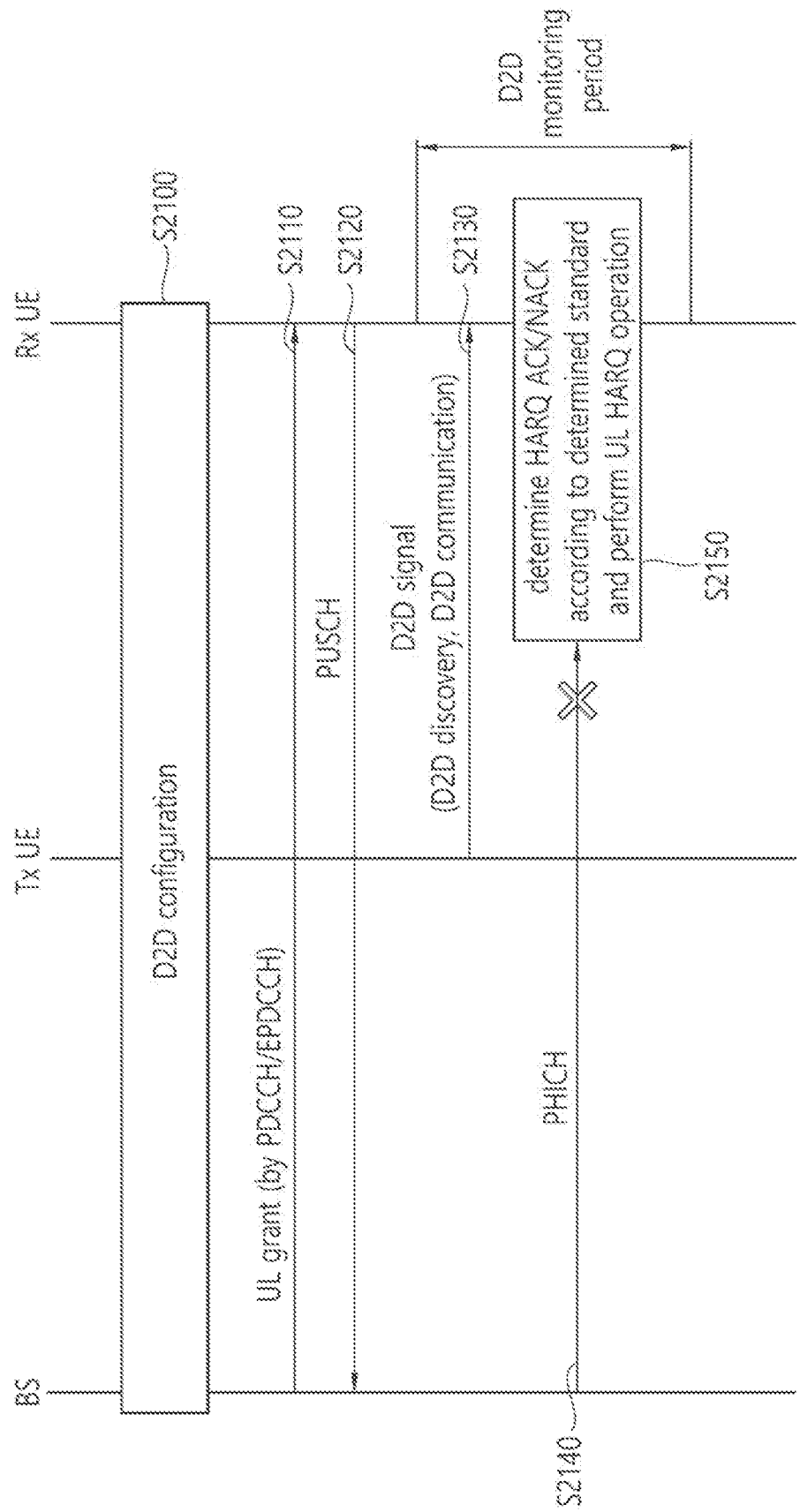
FIG. 21 is a flowchart illustrating a UL HARQ performing method when a D2D monitoring period and a PHICH reception timing overlap.

FIG. 21 is a flowchart illustrating a UL HARQ-performing method when a D2D monitoring period and PHICH reception timing overlap.

Referring to FIG. 21, a BS and D2D UEs perform a D2D configuration procedure in operation S2100. In this instance, a Tx UE and an Rx UE among the D2D UEs may receive D2D configuration information from the BS. Here, the Tx UE and the Rx UE are relative concepts for D2D communication. The D2D configuration information may be transmitted through a System Information Block (SIB), or may be transmitted through Radio Resource Control (RRC) signaling. The Tx UE and the Rx UE may determine/detect a D2D monitoring period based on the D2D configuration information.

The Rx UE receives a UL grant from the BS in operation S2110. The UL grant may be received through a PDCCH/ EPDCCH. The UL grant may indicate a PUSCH transmission in a first timing. The Rx UE transmits a PUSCH to the BS in the first timing based on the UL grant in operation S2120.

The Tx UE transmits a D2D signal based on the D2D configuration information in operation S2130. Here, the D2D signal includes a D2D discovery signal and a D2D communication signal. The D2D communication signal includes SA and D2D data.

The BS transmits a PHICH indicating HARQ ACK/ NACK with respect to the PUSCH based on whether the BS successfully receives the PUSCH, to the Rx UE at a second timing in operation S2140.

When a D2D monitoring period and second timing for the PHICH reception overlap, the Rx UE expects reception of a D2D signal and does not expect reception of a PHICH. That is, the Rx UE does not receive the PHICH, determines HARQ ACK/NACK with respect to the PUSCH according to the predetermined standard, and performs a UL HARQ operation based on this determination in operation S2150.

For example, when the D2D monitoring period and second timing overlap, it may be determined that the corresponding PHICH indicates ACK. In this instance, the physical layer of the UE does not expect reception of a PHICH in a DL subframe of the corresponding second timing, and may transfer an ACK signal with respect to a transmission block (TB) associated with the PUSCH to a higher layer, e.g., MAC layer, (alt 1-1). Alternatively, when a MAC PDU for the corresponding PUSCH transmission is not obtained from an Msg3 buffer, the MAC layer (or MAC entity) of the UE may set "HARQ_FEEDBACK", which is a state variable associated with the HARQ process of a corresponding UE, to ACK (alt 1-2).

As another example, when the D2D monitoring period and second timing overlap, it may be determined that the corresponding PHICH indicates NACK. In this instance, the physical layer of the UE does not expect reception of a PHICH in a DL subframe of the corresponding second timing, and may transfer a NACK signal with respect to a transmission block (TB) associated with the PUSCH to a higher layer, e.g., MAC layer, (alt 2-1). Alternatively, when a MAC PDU for the corresponding PUSCH transmission is not obtained from an Msg3 buffer, the MAC layer (or MAC entity) may indicate/perform a non-adaptive retransmission of the corresponding PUSCH with timing determined by the HARQ entity (alt 2-2).

Figure 22:
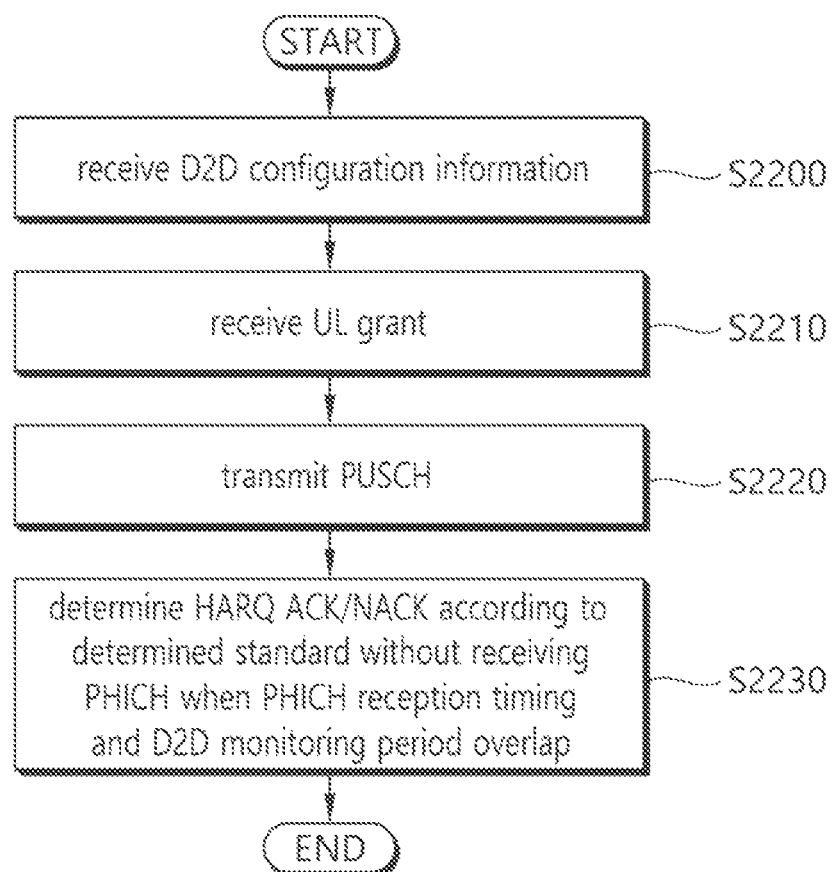
FIG. 22 is a flowchart illustrating the operations of a UE according to the present disclosure.

FIG. 22 is a flowchart illustrating the operations of a UE according to the present disclosure. In FIG. 22, the UE may correspond to the Rx UE of FIG. 21.

Referring to FIG. 22, the UE receives D2D configuration information in operation S2200. The UE may receive the D2D configuration information from a BS, or may receive the D2D configuration information through another D2D UE. The UE may detect a D2D monitoring period based on the D2D configuration information.

The UE receives a UL grant indicating a PUSCH transmission from the BS in operation S2210. The UL grant may indicate the PUSCH transmission using first timing.

The UE transmits a PUSCH to the BS with the first timing based on the UL grant in operation S2220. A PHICH that carries (or indicates) HARQ ACK/NACK with respect to the PUSCH may be transmitted from the BS with a second timing.

Subsequently, a D2D monitoring period for detecting a D2D transmitted from another D2D UE may overlap the second timing. In this instance, the UE expects reception of a D2D signal, and may not expect reception of a PHICH. That is, the UE does not receive the PHICH, determines HARQ ACK/NACK with respect to the PUSCH according to the determined standard, and performs a UL HARQ operation based on the determination in operation S2230.

For example, when the D2D monitoring period and second timing overlap, it may be determined that the corresponding PHICH indicates ACK. In this instance, the physical layer of the UE does not expect reception of a PHICH in a DL subframe of the corresponding second timing, and may transfer an ACK signal with respect to a transmission block (TB) associated with the PUSCH to a higher layer, e.g., MAC layer, (alt 1-1). Alternatively, when a MAC PDU for the corresponding PUSCH transmission is not obtained from an Msg3 buffer, the MAC layer (or MAC entity) of the UE may set "HARQ_FEEDBACK", which is a state variable associated with a HARQ process of the corresponding UE, to ACK (alt 1-2).

As another example, when the D2D monitoring period and the second timing overlap, it may be determined that the corresponding PHICH indicates NACK. In this instance, the physical layer of the UE does not expect reception of a PHICH in a DL subframe of the corresponding second timing, and may transfer a NACK signal with respect to a transmission block (TB) associated with the PUSCH to a higher layer, e.g., MAC layer, (alt 2-1). Alternatively, when a MAC PDU for the corresponding PUSCH transmission is not obtained from an Msg3 buffer, the MAC layer (or MAC entity) may indicate/perform a non-adaptive retransmission of the corresponding PUSCH using timing determined by the HARQ entity (alt 2-2).

Figure 23:
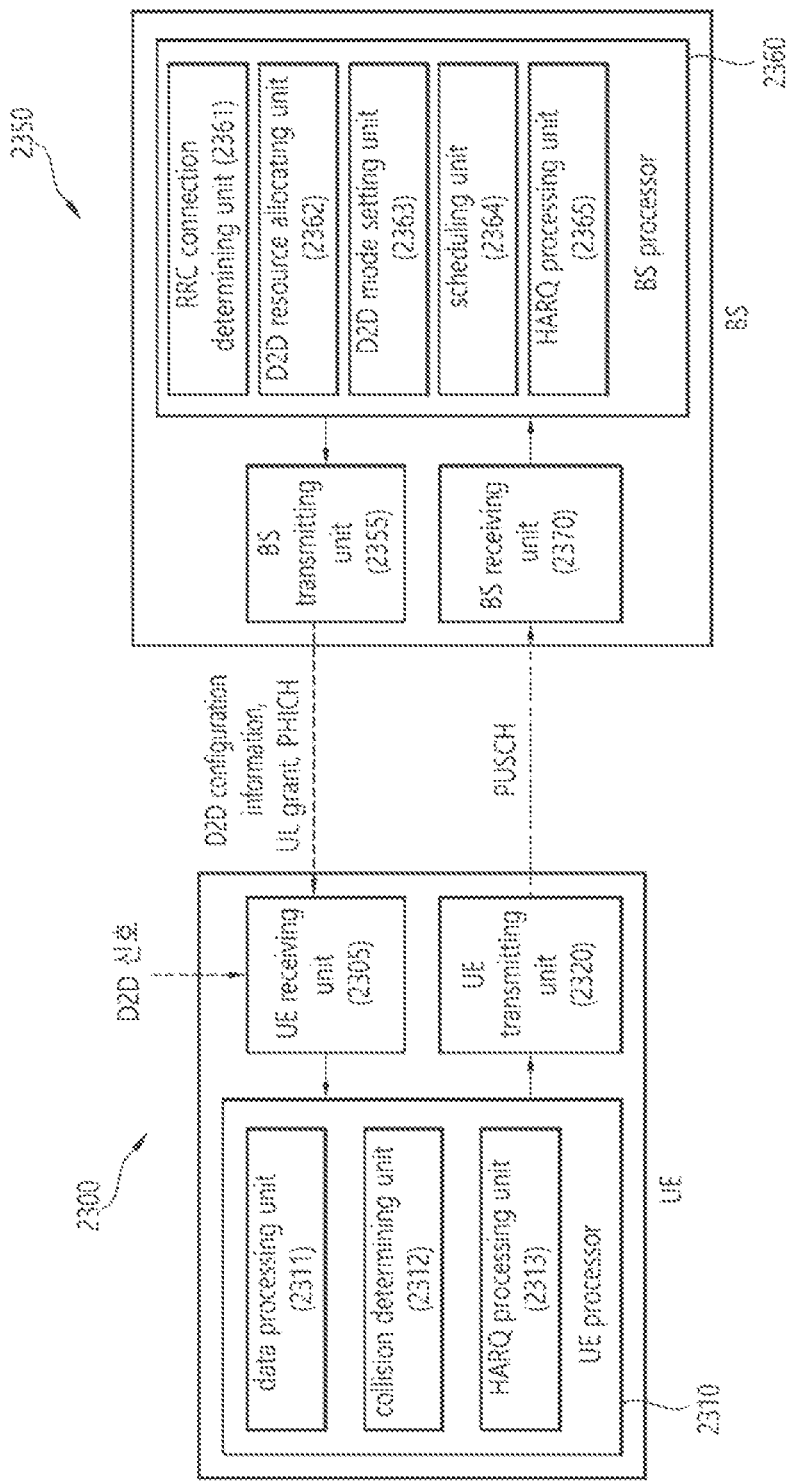
FIG. 23 is a block diagram illustrating an example of another UE according to the present disclosure.

FIG. 23 is a block diagram illustrating an example of another UE according to the present disclosure.

Referring to FIG. 23, a UE 2300 includes a receiving unit 2305, a UE processor 2310, and a UE transmitting unit 2320. The UE may further include a memory (not illustrated). The memory is connected with the UE processor 2310, and stores various pieces of information for driving the UE processor 2310. In the above described embodiments, the operations of the UE 2300 may be implemented under the control of the UE processor 2310. Particularly, the UE processor 2310 includes a data processing unit 2311, a collision determining unit 2312, and a HARQ processing unit 2313.

The UE receiving unit 2305 receives D2D configuration information from a BS 2350.

The UE receiving unit 2305 may receive a D2D signal transmitted from another D2D UE. Also, the UE receiving unit 2305 may receive a UL grant and a PHICH transmitted from the BS 2350.

The data processing unit 2311 generates a PUSCH based on the UL grant, and transmits the generated PUSCH to the BS through the UE transmitting unit 2320 using first timing.

The HARQ processing unit 2313 determines that a HARQ ACK/NACK signal with respect to the PUSCH may be transmitted from the BS using second timing, and controls the UE receiving unit 2305. The UE receiving unit 2305 may receive the HARQ ACK/NACK signal through the PHICH.

The collision determining unit 2312 may detect a D2D monitoring period based on the D2D configuration information. The collision determining unit 2312 determines whether a timepoint corresponding to the second timing at which the PHICH is transmitted from the BS 2350 and the D2D monitoring period overlap in the time axis. When the second timing and D2D monitoring period overlap, the collision determining unit 2312 controls the UE receiving unit 2305 to preferentially receive a D2D signal of the D2D monitoring period. That is, in this instance, the collision determining unit 2312 expects reception of a D2D signal, and does not expect reception of a PHICH.

When the second timing and D2D monitoring period overlap and the UE receiving unit 2305 does not receive a PHICH, the HARQ processing unit 2313 determines HARQ ACK/NACK with respect to the PUSCH according to a predetermined rule, and performs a UL HARQ operation based on the determination.

For example, when the D2D monitoring period and second timing overlap, the HARQ processing unit 2313 may determine that the corresponding PHICH indicates ACK. In this instance, the HARQ processing unit 2313 may control the physical layer to transfer an ACK signal with respect to a transmission block (TB) associated with the PUSCH to a higher layer, e.g., MAC layer, (alt 1-1). Alternatively, when a MAC PDU for the corresponding PUSCH transmission is not obtained from an Msg3 buffer, the HARQ processing unit 2313 may control the MAC layer (or MAC entity) to set "HARQ_FEEDBACK", which is a state variable associated with a HARQ process of the corresponding UE, to ACK (alt 1-2).

As another example, when the D2D monitoring period and the second timing overlap, the HARQ processing unit 2313 may determine that the corresponding PHICH indicates NACK. In this instance, the HARQ processing unit 2313 may control the physical layer to transfer a NACK signal with respect to a transmission block (TB) associated with the PUSCH to a higher layer (MAC layer). Alternatively, when a MAC PDU for the corresponding PUSCH transmission is not obtained from an Msg3 buffer, the HARQ processing unit 2313 may control the MAC layer (or MAC entity) to indicate/perform a non-adaptive retransmission of the corresponding PUSCH using determined timing through the HARQ entity.

The BS 2350 includes a BS transmitting unit 2355, a BS processor 2360, and a BS receiving unit 2370. The BS 2350 may further include a memory (not illustrated). The memory may be connected with the BS processor 2360, and may store various pieces of information for driving the BS processor 2360. The operations of the BS 2350 in the above described embodiments may be implemented under the control of the BS processor 2360. The BS processor 2360 includes an RRC connection determining unit 2361, a D2D resource allocating unit 2362, a D2D mode setting unit 2363, a scheduling unit 2364, and a HARQ processing unit 2365.

The BS transmitting unit 2355 transmits D2D configuration information to the UE 2300. The BS transmitting unit 2355 transmits a UL grant to the UE 2300. The BS transmitting unit 2355 transmits a PHICH to the UE 2300.

The BS receiving unit 2370 receives a PUSCH from the UE 2300.

The RRC connection determining unit 2361 may determine whether the UE 2300 is an idle mode or an RRC-connected mode.

The HARQ processing unit 2365 determines whether the BS receiving unit 2370 successfully receives a PUSCH, and generates HARQ ACK/NACK information. The BS transmitting unit 2355 may transmit the HARQ ACK/NACK information to a UE through a PHICH.

The D2D mode setting unit 2363 may set a D2D mode of the UE 2300.

The D2D resource allocating unit 2362 may generate information associated with a resource pool for D2D communication based on whether the UE 2300 is in an idle mode or an RRC-connected mode. Also, the D2D resource allocating unit 2362 generates D2D configuration information. The D2D configuration information may include information associated with a D2D monitoring period (resource monitoring information). The D2D configuration information may include information associated with a D2D resource pool for D2D mode 2. The resource monitoring information may include only information associated with a period for monitoring D2D signals of D2D UEs that access a single operator's network, or may also include information associated with a period for monitoring D2D signals of D2D UEs that access a different operator's network.

What is claimed is:

1. A method comprising:
receiving, by a user device and via a first carrier, an uplink grant in subframe n;
determining a time period for a wireless communication between user devices, wherein the wireless communication between user devices is associated with a second carrier;
determining, by the user device and based on the uplink grant received via the first carrier, a first subframe associated with an uplink signal to a base station associated with the first carrier;

based on determining that the first subframe overlaps in time with the time period, refraining from transmitting the uplink signal in the first subframe; and transmitting, based on a reception timing of the uplink grant and based on a non-adaptive retransmission, the uplink signal in subframe n+12, wherein the first subframe corresponds to subframe n+4.

2. The method of claim 1, wherein the uplink signal comprises uplink shared channel data.

3. The method of claim 1, wherein the time period comprises one or more subframes associated with the second carrier.

4. A method of transmitting uplink data, the method comprising:

determining, by a user device, a time period for monitoring a wireless communication between user devices;

determining, by the user device, a first subframe associated with a Hybrid Automatic Repeat Request (HARQ) feedback reception; and based on whether the first subframe overlaps in time with the time period, setting a state variable associated with the HARQ feedback reception to acknowledgement.

5. The method of claim 4, wherein setting the state variable associated with the HARQ feedback reception to acknowledgement comprises:

based on determining that the first subframe overlaps in time with the time period and determining that a Media Access Control Protocol Data Unit (MAC PDU) was not obtained from a Message3 buffer, setting, by a MAC entity of the user device, the state variable associated with the HARQ feedback reception to acknowledgement.

6. The method of claim 5, wherein the MAC entity of the user device sets the state variable associated with the HARQ feedback reception to acknowledgement without confirming acknowledgement information of the HARQ feedback reception scheduled to be received in the first subframe.

7. A user device comprising:

a wireless transceiver comprising an antenna and configured to receive, via a first carrier, an uplink grant in subframe n; and one or more processors;

configured to:
determine a time period for a wireless communication between user devices, wherein the wireless communication between user devices is associated with a second carrier;

determine, based on the uplink grant received via the first carrier, a first subframe associated with an uplink signal to a base station associated with the first carrier;

based on determining that the first subframe overlaps in time with the time period, refrain from transmitting the uplink signal in the first subframe; and control the wireless transceiver to transmit, based on a reception timing of the uplink grant and based on a non-adaptive retransmission, the uplink signal in subframe n+12, wherein the first subframe corresponds to subframe n+4, and wherein the wireless transceiver transmits the uplink signal in the subframe n+12.

8. The user device of claim 7, wherein the uplink signal comprises uplink shared channel data.

9. The user device of claim 7, wherein the time period comprises one or more subframes associated with the second carrier.

10. A user device of transmitting uplink data, the user device comprising:

one or more processors; and memory storing instructions that, when executed, cause the user device to:

determine a time period for monitoring a wireless communication between user devices;

determine a first subframe associated with a Hybrid Automatic Repeat Request (HARQ) feedback reception; and based on whether the first subframe overlaps in time with the time period, set a state variable associated with the HARQ feedback reception to acknowledgement.

11. The user device of claim 10, wherein setting the state variable associated with the HARQ feedback reception to acknowledgement comprises:

based on determining that the first subframe overlaps in time with the time period and determining that a Media Access Control Protocol Data Unit (MAC PDU) was not obtained from a Message3 buffer, set, by a MAC entity of the user device, the state variable associated with the HARQ feedback reception to acknowledgement.

12. The user device of claim 11, wherein the MAC entity of the user device sets the state variable associated with the HARQ feedback reception to acknowledgement without confirming acknowledgement information of the HARQ feedback reception scheduled to be received in the first subframe.

13. A method comprising:

receiving, by a wireless user device from a base station, an uplink grant in a first subframe corresponding to subframe n;

determining, based on the uplink grant, a second subframe associated with an uplink signal, wherein the uplink signal comprises an uplink shared channel transmission to the base station, and wherein the second subframe corresponds to subframe n+4;

determining that the second subframe overlaps in time with a time period in which a wireless communication between wireless user devices is scheduled;

based on determining that the second subframe overlaps in time with the time period, refraining from transmitting the uplink signal in the second subframe; and transmitting, based on a reception timing of the uplink grant and after the refraining from transmitting the uplink signal in the second subframe, the uplink signal in a third subframe corresponding to subframe n+12.

14. The method of claim 13, wherein the transmitting the uplink signal in the third subframe is performed without a Hybrid Automatic Repeat Request (HARQ) feedback.

15. The method of claim 13, wherein the uplink grant is received via a first carrier, and wherein the wireless communication between wireless user devices is associated with a second carrier.

16. The method of claim 13, wherein the time period is a time period for a device-to-device discovery signal communication.

17. The method of claim 1, wherein the time period is a time period for a device-to-device discovery signal communication.

18. The method of claim 1, wherein the transmitting the uplink signal in the subframe n+12 is performed without a Hybrid Automatic Repeat Request (HARQ) feedback.

19. The user device of claim 7, wherein the time period is a time period for a device-to-device discovery signal communication.

20. The user device of claim 7, wherein the one or more processors is configured to control the wireless transceiver to transmit the uplink signal in the subframe n+12 without a Hybrid Automatic Repeat Request (HARQ) feedback.

* * * * *